(12) United States Patent
Jung et al.

(10) Patent No.: US 8,642,722 B2
(45) Date of Patent: Feb. 4, 2014

(54) PREPARATION METHOD OF POLYBENZIMIDAZOLE

(75) Inventors: Chul-Ho Jung, Gwangju (KR);
Sang-Hoon Han, Seoul (KR); Jae-Eun Lee, Seoul (KR); Young-Moo Lee, Seoul (KR); Ho-Bum Park, Ulsan (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 258 days.

(21) Appl. No.: 12/466,499

(22) Filed: May 15, 2009

(65) Prior Publication Data

US 2010/0292356 A1 Nov. 18, 2010

(51) Int. Cl.
| C08G 63/02 | (2006.01) |
| C08G 69/26 | (2006.01) |
| C08G 69/28 | (2006.01) |
| C08G 73/00 | (2006.01) |
| C08G 64/00 | (2006.01) |
| C08G 73/06 | (2006.01) |
| C08C 1/14 | (2006.01) |

(52) U.S. Cl.
USPC ........... 528/423; 528/272; 528/332; 528/335; 528/336; 528/367; 528/370; 528/422; 528/488

(58) Field of Classification Search
USPC ......... 528/272, 332, 335, 336, 367, 370, 422, 528/423, 488
See application file for complete search history.

(56) References Cited

U.S. PATENT DOCUMENTS

| 3,174,947 A | * | 3/1965 | Marvel et al. | 528/331 |
| RE26,065 E | * | 7/1966 | Marvel | 528/341 |
| 3,313,783 A | * | 4/1967 | Iwakura et al. | 528/336 |
| 3,433,772 A | * | 3/1969 | Chenevey et al. | 528/341 |
| 3,502,606 A | * | 3/1970 | Smart et al. | 524/233 |
| 3,509,108 A | * | 4/1970 | Prince | 528/342 |
| 3,549,603 A | * | 12/1970 | Chenevey et al. | 528/303 |
| 3,551,389 A | * | 12/1970 | Prince, Jr. | 528/186 |
| 3,708,439 A | * | 1/1973 | Sayigh | 28/186 |
| 4,092,274 A | * | 5/1978 | Fletcher et al. | 521/117 |
| 4,154,919 A | * | 5/1979 | Sheratte | 528/186 |
| 4,483,977 A | * | 11/1984 | Conciatori et al. | 528/342 |
| 4,533,725 A | * | 8/1985 | Choe et al. | 528/336 |
| 4,535,144 A | * | 8/1985 | Choe et al. | 528/207 |
| 4,588,808 A | * | 5/1986 | Ward | 528/337 |
| 4,607,083 A | * | 8/1986 | Muenstedt et al. | 525/417 |
| 4,672,104 A | * | 6/1987 | Ward | 528/336 |
| 4,839,322 A | * | 6/1989 | Yodice | 502/159 |
| 5,262,056 A | * | 11/1993 | Koros et al. | 210/654 |
| 7,060,782 B2 | * | 6/2006 | Dawkins et al. | 528/327 |
| 2005/0000899 A1 | * | 1/2005 | Koros et al. | 210/650 |

FOREIGN PATENT DOCUMENTS

KR 10-2006-0085846 7/2006

OTHER PUBLICATIONS

Jae Eun Lee et al., Preparation and characterization of thermally rearranged polymer membranes derived from amine-containing polyimide, Spring Meeting of the Membrane Society of Korea, May 16, 2008.
S.Han et al., Thermally Rearranged Polymer Membranes Derived from Amine-containing Polyimide for Gas Separation, International Congress on Membranes and Membrane Processes, Jul. 14, 2008.
Jae Eun Lee et al., Thermally Rearranged Polybenzimidazole Membranes Derived from Amine-containing Polyimide for Gas Separation, Fall Meeting of The Polymer Society of Korea, Oct. 9, 2008.
Jae Eun Lee et al., Preparation and Characterization of Polybenzimidazole Membrane via Thermal Rearrangement of Polyrrolone, Fall Meeting of the Membrane Society of Korea, Nov. 6, 2008.
Jae Eun Lee. Preparation and Characterization of Polybenzimidazole Membrane via Thermal Rearrangement of Polyrrolone, Thesis, Feb. 28, 2009.
Korean Patent Office, Office Action of the corresponding Korean Patent Application No. 10-2009-0042845 (Oct. 19, 2013).

* cited by examiner

*Primary Examiner* — Melissa Rioja
(74) *Attorney, Agent, or Firm* — Lexyoume IP Meister, PLLC.

(57) ABSTRACT

Disclosed is a method of preparing porous polybenzimidazole. The method includes providing polyaminoimide by reacting aromatic amine including at least two ortho-positioned amino groups and acid dianhydride, obtaining polypyrrolone from the polyaminoimide, subjecting the polypyrrolone to alkaline treatment, and subjecting the alkaline-treated polypyrrolone to heat treatment. The polybenzimidazole shows permeability and selectivity for various gases due to a fractional free volume and well-connected picopores.

8 Claims, 12 Drawing Sheets

PREPARATION METHOD OF POLYBENZIMIDAZOLE

BACKGROUND OF THE INVENTION (a) Field of the Invention

This disclosure relates to a method of preparing a porous polybenzimidazole.

(b) Description of the Related Art

A highly permeable polymer membrane has drawn attention as a gas separation membrane (Park, H. B. et al., Science, 2007. 318 5848 p. 254-258; Koros, W. J et al., Journal of Membrane Science, 1993. 83 1 p. 1-80; Robeson, L. M. et al., Polymer, 1994. 35 23 p. 4970-4978).

Glassy polymers such as poly(1-trimethylsilyl-1-propyne) (PTMSP) and a polymer with intrinsic microporosity (PIM) have been reported to have high gas permeability due to cavities present in the glassy polymer matrix (Langsam, M. et al., Gas Separation and Purification, 1988. 2 4 p. 162-170; Langsam, M et al., Polymer Engineering and Science, 1989. 29 1 p. 44-54; Srinivasan, R. et al., Journal of Membrane Science, 1994. 86 1-2 p. 67-86). Such glassy polymers have extensive applicability at a high temperature and high gas permeability, and therefore are applicable as a separation membrane. However these types of glassy polymers show a limited and low gas selectivity.

Polybenzimidazole has excellent high temperature characteristics (Q. Z. Liu et al., Polymeric Materials Science and Engineering, 2005. 21 p. 29; Herward Vogel et al., Journal of Polymer Science, 1961. 50 154 p. 511-539), high glass transition temperature (Tg=425-435° C., He, R. et al., Journal of Membrane Science, 2006. 277 1-2 p. 38-45), excellent mechanical stability (Tsur, Y. et al., Journal of Polymer Science Part A-1 Polymer Chemistry, 1974. 12 7 p. 1515-1529), and chemical stability against hydrolysis reactions of acids or bases (Q. Z. Liu et al., Polymeric Materials Science and Engineering, 2005. 21 p. 29;). Therefore, it may be appropriately applicable as a high temperature fiber, a cationic conductive polymer, etc. (Li, Z. X. et al., Journal of Polymer Science, Part A: Polymer Chemistry, 2006. 44 19 p. 5729-5739).

SUMMARY OF THE INVENTION

Polybenzimidazole has drawbacks of poor processibility due to low solubility in an organic solvent, and low gas permeability due to its rigid structure.

One aspect of the present invention provides a method of preparing polybenzimidazole having excellent gas permeability and selectivity.

According to one aspect of the present invention, a method of preparing porous polybenzimidazole that includes providing polyaminoimide by reacting an aromatic amine including at least two ortho-positioned amino groups and acid dianhydride, obtaining polypyrrolone from the polyaminoimide, subjecting the polypyrrolone to alkaline treatment, and subjecting the alkaline-treated polypyrrolone to heat treatment.

The polypyrrolone may be obtained by heat treating polyaminoimide at 150 to 500° C. for 5 minutes to 12 hours under an inert atmosphere. The polypyrrolone may be obtained by heat treating polyaminoimide at 400 to 500° C. for 10 minutes to 2 hours under an inert atmosphere.

The alkaline treatment of the polypyrrolone may be performed at 60 to 120° C. for 5 minutes to 5 hours. The alkaline treatment of the polypyrrolone may be performed using alkaline compounds selected from an alkaline metal hydroxide, a hydride, an amide, an alkoxide, and combinations thereof.

The heat treatment of the alkaline-treated polypyrrolone may be performed at 150 to 500° C. for 5 minutes to 12 hours under an inert atmosphere. The heat treatment of the alkaline-treated polypyrrolone may be performed at 400 to 500° C. for 5 minutes to 2 hours under an inert atmosphere.

The polybenzimidazole may include one of the compounds represented by the following Chemical Formulae 1 to 3.

[Chemical Formula 1]

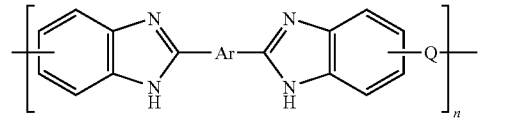

[Chemical Formula 2]

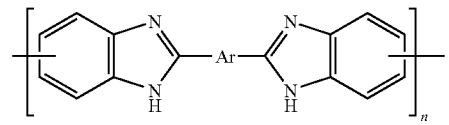

[Chemical Formula 3]

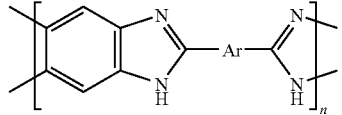

In the above Chemical Formulae 1 to 3, Ar is an aromatic group selected from a substituted or unsubstituted divalent C6 to C24 arylene group and a substituted or unsubstituted divalent C4 to C24 heterocyclic group, where the aromatic group is present singularly, at least two aromatic groups are fused to form a condensed cycle, or at least two aromatic groups are linked by a single bond or a functional group selected from O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, and C(=O)NH, Q is O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, and n is an integer ranging from 10 to 400.

The polyaminoimide may include one of the compounds represented by the following Chemical Formulae 4 to 6.

[Chemical Formula 4]

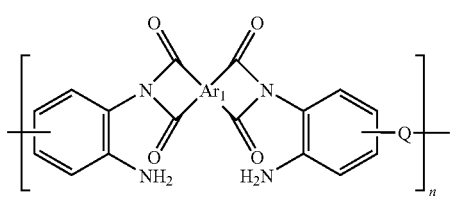

[Chemical Formula 5]

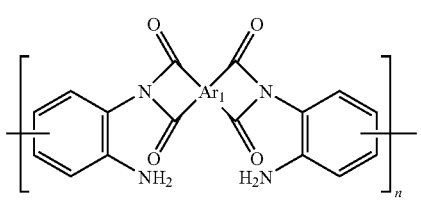

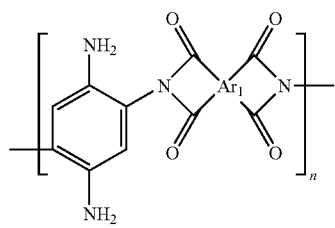

[Chemical Formula 6]

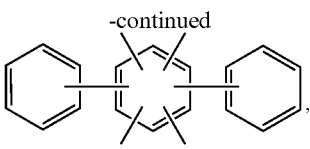

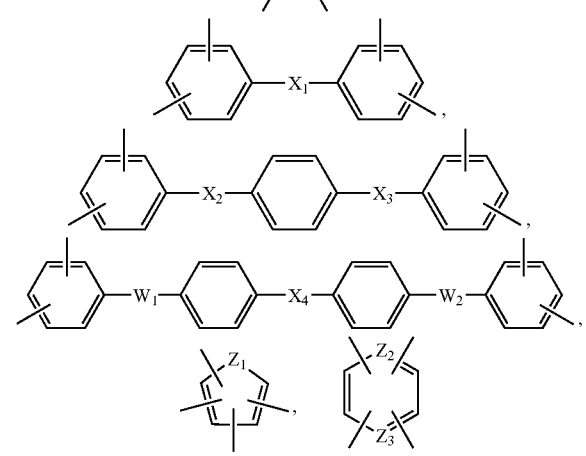

In the above Chemical Formulae 4 to 6, $Ar_1$ is an aromatic group selected from a substituted or unsubstituted quadrivalent C6 to C24 arylene group and a substituted or unsubstituted quadrivalent C4 to C24 heterocyclic group, where the aromatic group is present singularly, at least two aromatic groups are fused to form a condensed cycle, or at least two aromatic groups are linked by single bond or a functional group selected from O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, and C(=O)NH, Q is O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, and n is an integer ranging from 10 to 400.

$Ar_1$ is represented by one of the following chemical formulae.

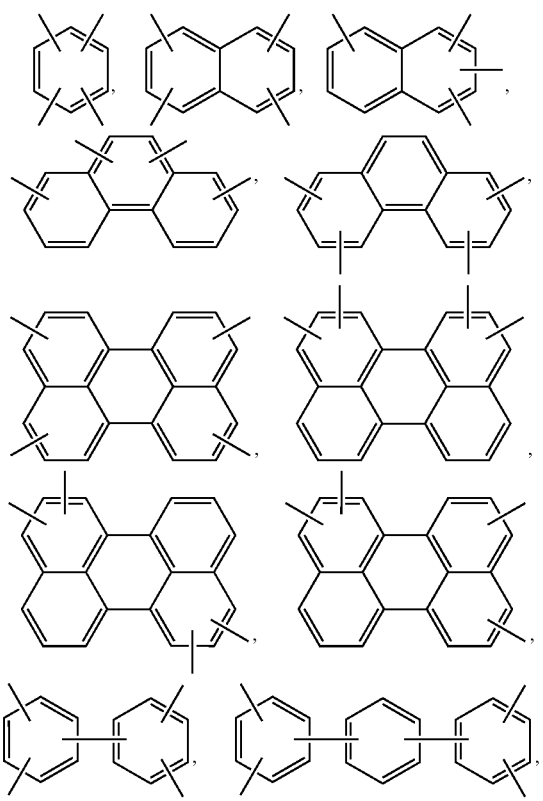

In the above chemical formulae, $X_1$, $X_2$, $X_3$, and $X_4$ are independently O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, or C(=O)NH, $W_1$ and $W_2$ are independently O, S, or C(=O), and $Z_1$ is O, S, CR$_1$R$_2$ or NR$_3$, where R$_1$, R$_2$, and R$_3$ are the same or different from each other and are independently hydrogen or a C1 to C5 alkyl group, and $Z_2$ and $Z_3$ are the same or different from each other and are independently N or CR$_4$ (where R$_4$ is hydrogen or a C1 to C5 alkyl group), provided that both $Z_2$ and $Z_3$ are not CR$_4$.

The polybenzimidazole shows permeability and selectivity for various gases due to a fractional free volume and well-connected picopores.

DETAILED DESCRIPTION

Figure 1A:
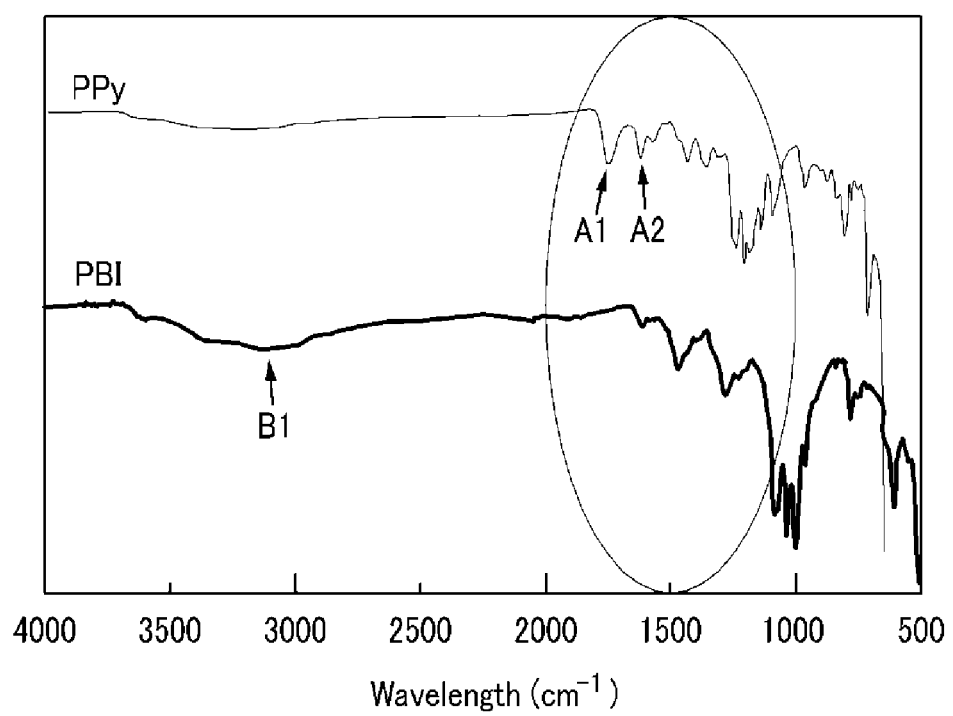
FIG. 1A shows ATR-FTIR spectra of the polyimidazopyrrolone (PPy) of the Chemical Formula 11 and polybenzimidazole (PBI) of the Chemical Formula 13 in Example 1.

Exemplary embodiments of the present invention will hereinafter be described in detail. However, these embodiments are only exemplary, and the present invention is not limited thereto.

As used herein, when a specific definition is not provided, the term "picopore" refers to a pico-sized pore having an average diameter ranging from 100 picometers to 1000 picometers.

As used herein, when a specific definition is not provided, the term "substituted" refers to a compound or a functional group where hydrogen is substituted with at least one substituent selected from the group consisting of a C1 to C10 alkyl group, a C1 to C10 alkoxy group, a C1 to C10 haloalkyl group, and a C1 to C10 haloalkoxy group. The term "heterocyclic group" refers to a C3 to C30 heterocycloalkyl group, a C3 to C30 heterocycloalkenyl group, or a C3 to C30 heteroaryl group including 1 to 3 heteroatoms selected from the group consisting of O, S, N, P, Si, and combinations thereof in one ring.

According to one embodiment of the present invention, a method of preparing porous polybenzimidazole is provided.

The porous polybenzimidazole has picopores in its structure, and is represented by one of the following Chemical Formulae 1 to 3.

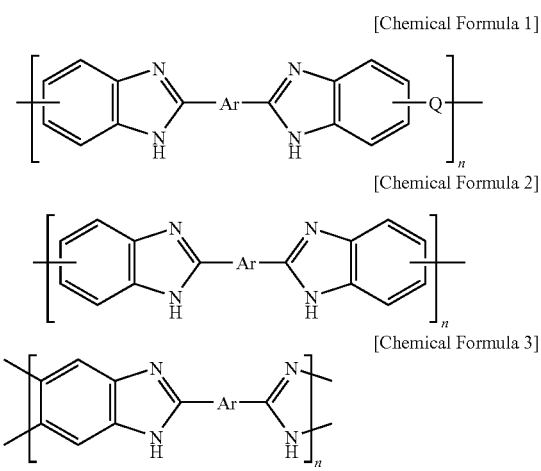

[Chemical Formula 1]

[Chemical Formula 2]

[Chemical Formula 3]

In the above Chemical Formulae 1 to 3, Ar is an aromatic group selected from a substituted or unsubstituted divalent C6 to C24 arylene group and a substituted or unsubstituted divalent C4 to C24 heterocyclic group, where the aromatic group is present singularly, at least two aromatic groups are fused to form a condensed cycle, or at least two aromatic groups are linked by a single bond or a functional group selected from O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, or C(=O)NH, Q is O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, and n is an integer ranging from 10 to 400.

According to one embodiment of the present invention, such a porous polyimidazole is prepared by the method including a method of preparing porous polybenzimidazole that includes providing polyaminoimide by reacting an aromatic amine including at least two ortho-positioned amino groups with an acid dianhydride, obtaining polypyrrolone from the polyaminoimide, subjecting the polypyrrolone to alkaline treatment, and subjecting the alkaline-treated polypyrrolone to heat treatment.

First, polyaminoimide is provided as follows.

The polyaminoimide is obtained by reacting an aromatic amine and an acid dianhydride.

The aromatic amine is a diamine compound having at least two ortho-positioned amino groups. Such an aromatic amine includes, for example, 1,2,4,5-benzenetetraaminetetrahydrochloride, 3,3'-diaminobenzidine, 4,4'-oxybis(1,2-benzenediamine), 3,3'4,4'-tetraaminodiphenylsulfone, and so on. In one embodiment, 3,3'-diaminobenzidine is preferable.

Non-limiting examples of the acid dianhydride include at least one of benzene-1,2,4,5-tetracarboxylic acid anhydride (PMDA), 3,3',4,4'-(hexafluoroisopropylidene)diphthalic acid dianhydride (6FDA), oxydiphthalic acid dianhydride (ODPA), benzophenone tetracarboxylic acid dianhydride (BTDA), 3,3',4,4'-diphenyltetracarboxylic acid dianhydride (BPDA), biphthalic acid anhydride, and the like. In one embodiment, 4,4'-(hexafluoroisopropylidene)diphthalic acid dianhydride may be preferable.

The aromatic amine and acid dianhydride are subjected to imidization reaction at about 120 to 350° C. for 1 hour to 24 hours to provide polyaminoimide. The imidization includes thermal imidization, chemical imidization, or thermal solution imidization.

The polyaminoimide may be selected from compounds represented by the following Chemical Formulae 4 to 6.

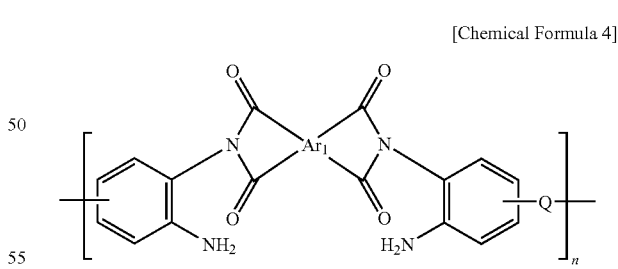

[Chemical Formula 4]

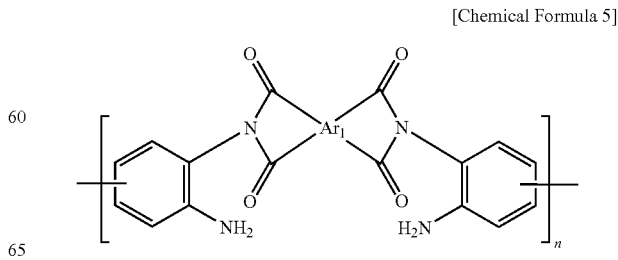

[Chemical Formula 5]

[Chemical Formula 6]

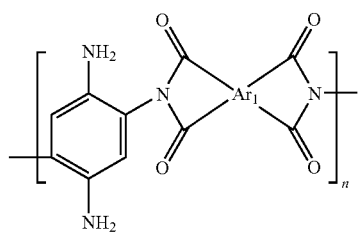

In the above Chemical Formulae 4 to 6, $Ar_1$ is an aromatic group selected from a substituted or unsubstituted quadrivalent C6 to C24 arylene group and a substituted or unsubstituted quadrivalent C4 to C24 heterocyclic group, where the aromatic group is present singularly, at least two aromatic groups are fused to form a condensed cycle, or at least two aromatic groups are linked by single bond or a functional group selected from O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, and C(=O)NH, and Q and n are the same as described above.

$Ar_1$ may be selected from the following chemical formulae.

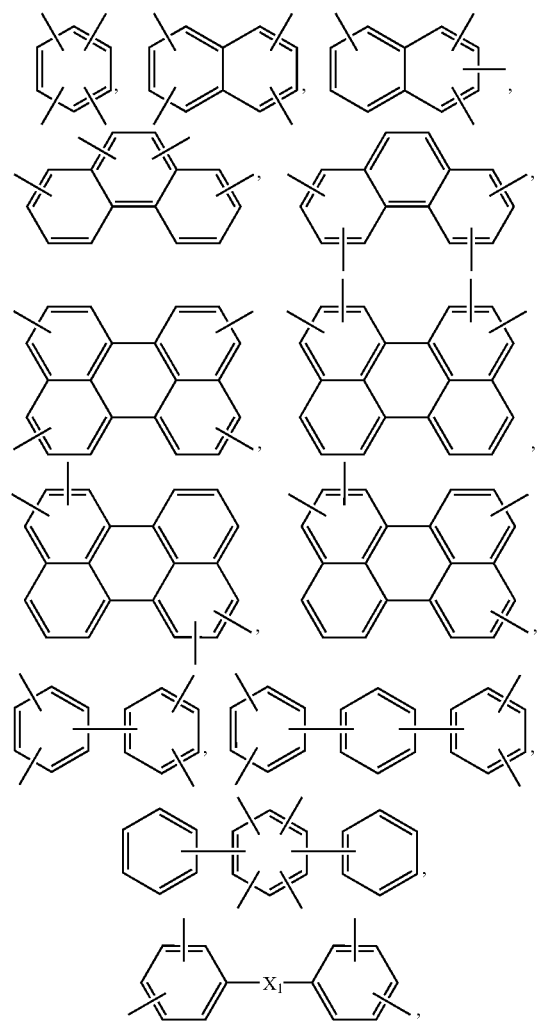

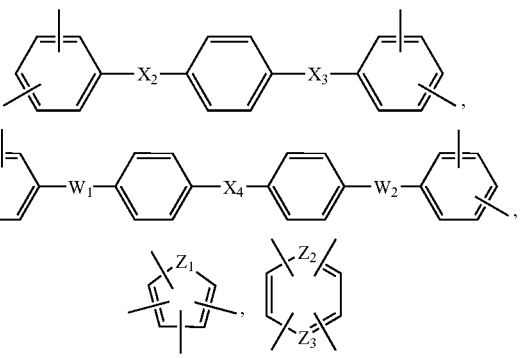

In the above chemical formulae, $X_1$, $X_2$, $X_3$, and $X_4$ are independently O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, or C(=O)NH, $W_1$ and $W_2$ are independently O, S, or C(=O), and $Z_1$ is O, S, CR$_1$R$_2$ or NR$_3$, where R$_1$, R$_2$, and R$_3$ are the same or different from each other and are independently hydrogen or a C1 to C5 alkyl group, and $Z_2$ and $Z_3$ are the same or different from each other and are independently N or CR$_4$ (where R$_4$ is hydrogen or a C1 to C5 alkyl group), provided that both $Z_2$ and $Z_3$ are not CR$_4$.

In one embodiment, $Ar_1$ may be selected from the following chemical formulae.

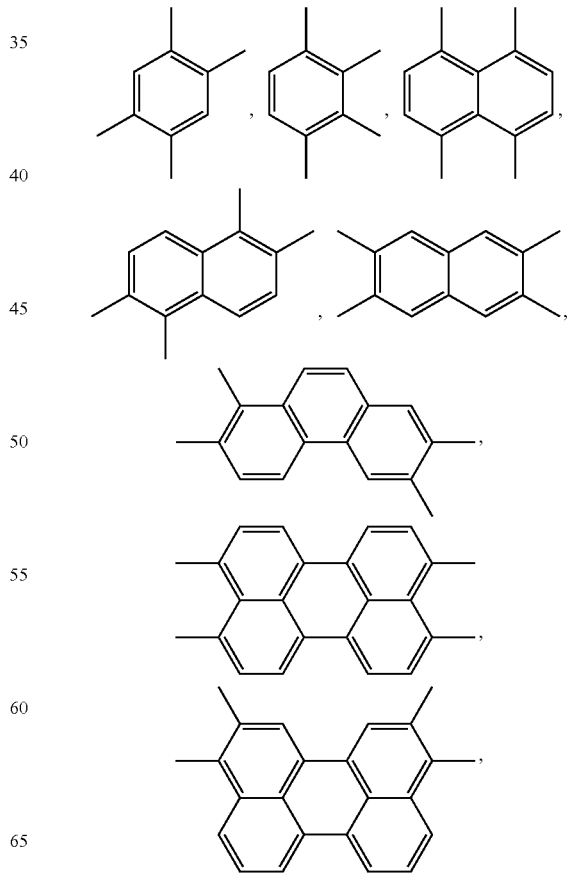

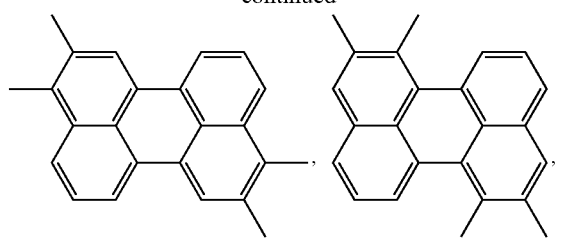
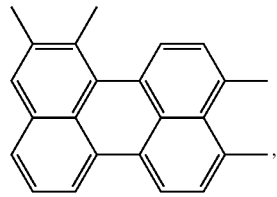
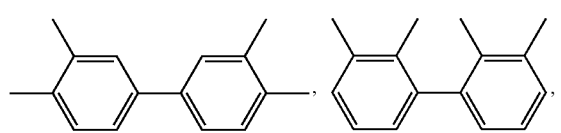
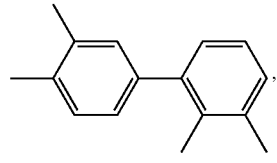
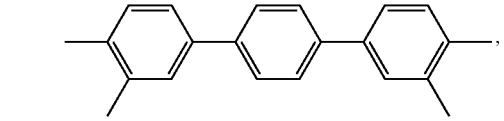
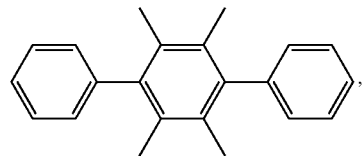
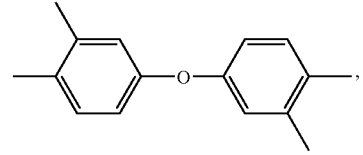
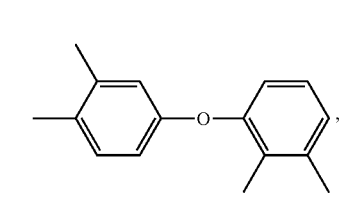
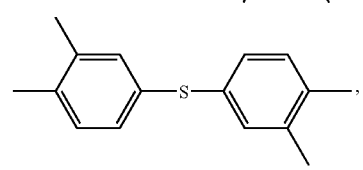
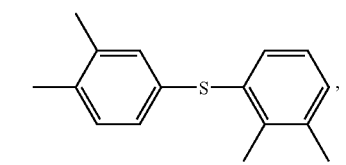
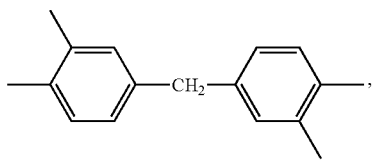
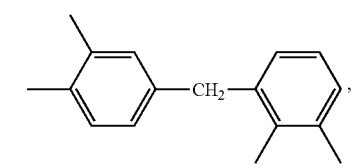
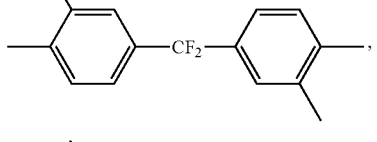
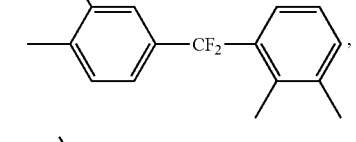
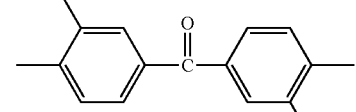
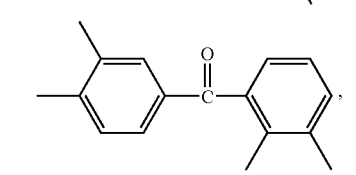
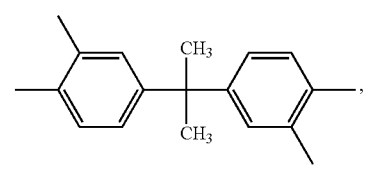
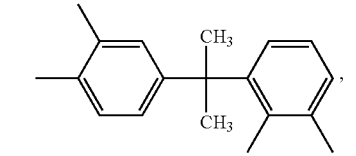
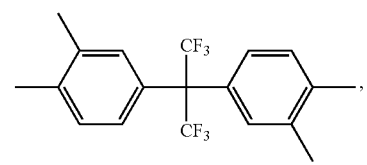
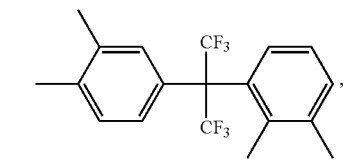

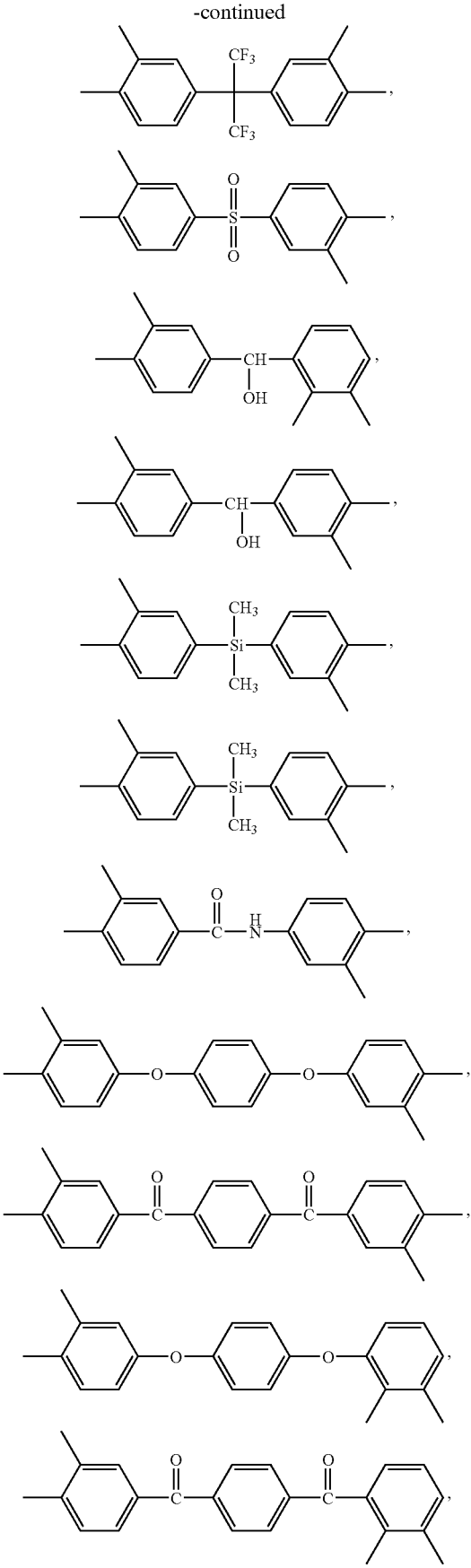

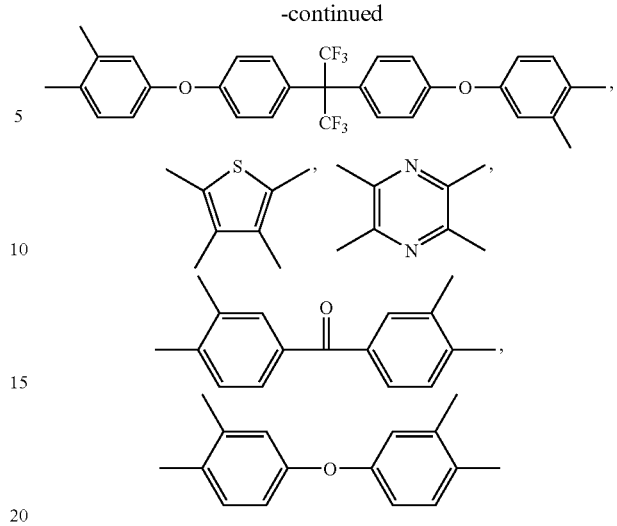

Subsequently, the polyaminoimide is subjected to heat treatment to obtain polypyrrolone.

Polypyrrolone is obtained by a dehydration reaction of polyaminoimide therein through heat treatment. The heat treatment may be performed at about 150 to about 500° C. for about 5 minutes to 12 hours under an inert atmosphere. In one embodiment, heat treatment may be performed at about 400 to about 500° C. ° C. for about 5 minutes to 2 hours under an inert atmosphere. Within the above temperature and time ranges, thermal a rearrangement reaction may be performed completely to prevent polypyrrolone structures from becoming weak and from being cracked during the subsequent alkaline treatment.

The obtained polypyrrolone has lower density and much finer porosity where a plurality of picopores is present in its molecular structure than polyaminoimide represented by Chemical Formulae 4 to 6. Therefore, the fractional free volume (FFV) is increased, d-spacing is also increased to incur morphology changes in the chemical structures, and thereby polypyrrolone has larger gas permeability than polyaminoimide.

For example, the polypyrrolone represented by Chemical Formulae 7 to 9 may obtain polyaminoimide represented by the above Chemical Formulae 4 to 6 as shown in the following Reaction Scheme 1.

[Reaction Scheme 1]

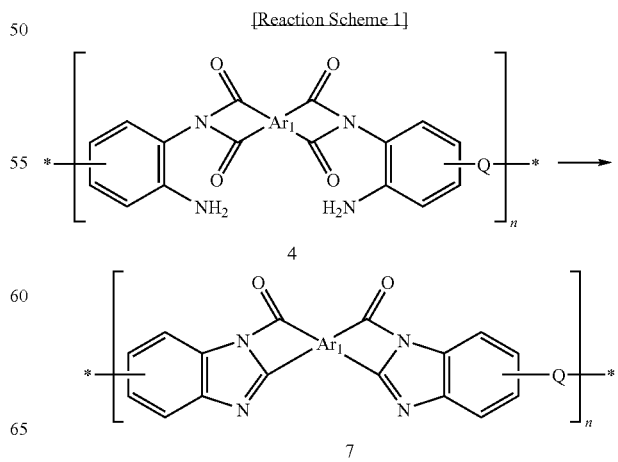

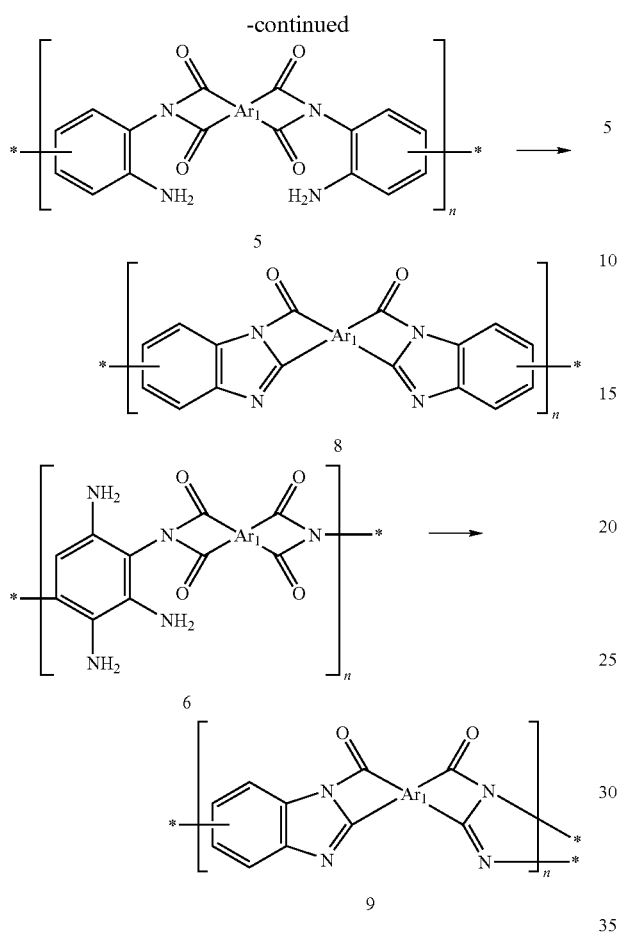

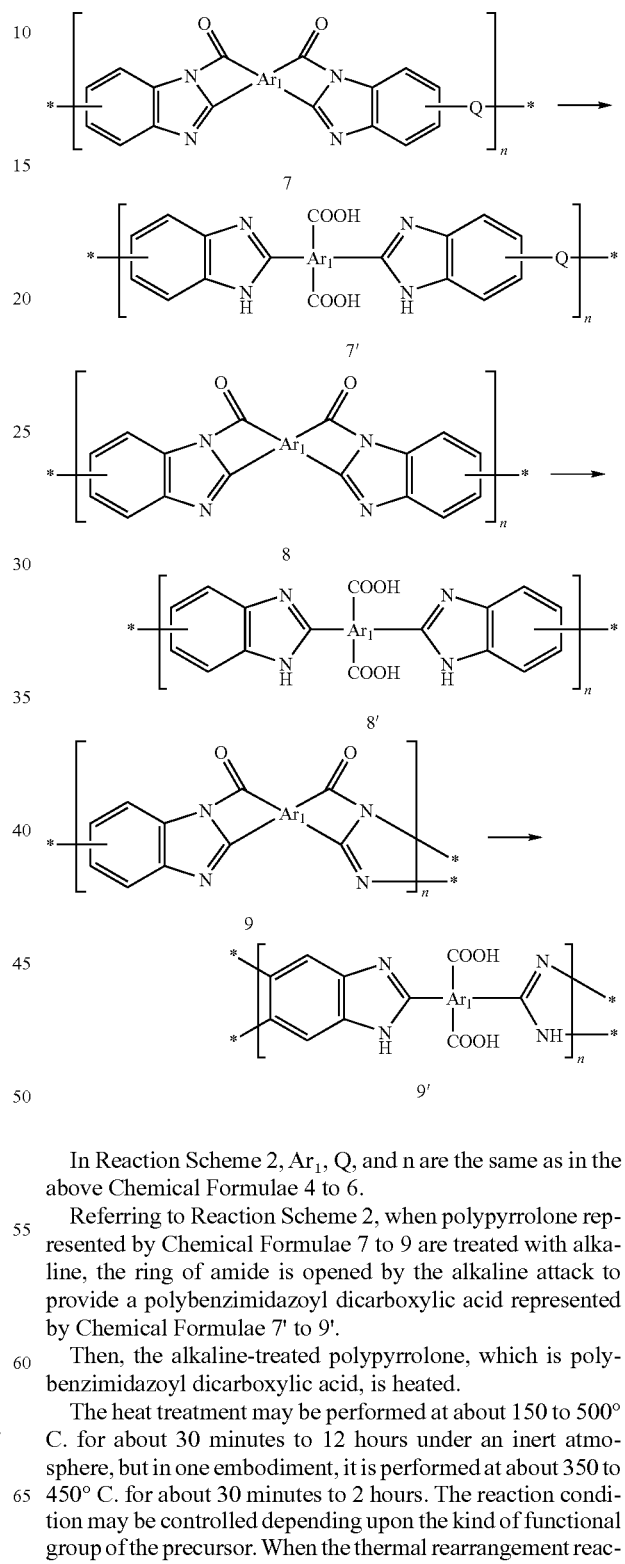

In the above Chemical Formulae 7 to 9, $Ar_1$, Q, and n are the same as defined in the above Chemical Formulae 4 to 6.

Subsequently, the polypyrrolone is subjected to alkaline treatment. The alkaline treatment is performed by adding alkaline compounds to the polypyrrolone within the predetermined temperature range.

The alkaline compound is required to have sufficient basicity to ring-opening polypyrrolone, and for example the alkaline compound may have basicity of pH 10.0 or more. When a solution including the alkaline compound having the above basicity is used, the alkaline compound may react with the amide group of polypyrrolone to perform a ring-opening reaction.

The usable alkaline compound includes any compound as long as it exhibits alkalinity in a solvent, and non-limiting example thereof includes an alkaline metal hydroxide such as potassium hydroxide and sodium hydroxide; a hydride such as lithium hydride and sodium hydride; an amide such as lithium amide, sodium amide, and potassium amide; an alkoxide such as sodium methoxide and potassium methoxide; and combinations thereof.

The alkaline treatment may be performed at about 60 to about 120° C. for about 10 minutes to about 5 hours, and in one embodiment, it is performed at about 90 to about 110° C. for about 30 minutes to about 2 hours. The reaction condition may be changed within the range depending upon the kind of $Ar_1$ and Q functional groups and the alkaline strength. The ring-opening reaction is effectively carried out within the temperature and time range to decrease the non-reacted precursor, so as to increase the degree of purity.

By the alkaline treatment, polybenzimidazoyl dicarboxylic acid represented by Chemical Formulae 7' to 9' is produced from polypyrrolone represented by Chemical Formulae 7 to 9 in accordance with, for example, the following Reaction Scheme 2.

[Reaction Scheme 2]

In Reaction Scheme 2, $Ar_1$, Q, and n are the same as in the above Chemical Formulae 4 to 6.

Referring to Reaction Scheme 2, when polypyrrolone represented by Chemical Formulae 7 to 9 are treated with alkaline, the ring of amide is opened by the alkaline attack to provide a polybenzimidazoyl dicarboxylic acid represented by Chemical Formulae 7' to 9'.

Then, the alkaline-treated polypyrrolone, which is polybenzimidazoyl dicarboxylic acid, is heated.

The heat treatment may be performed at about 150 to 500° C. for about 30 minutes to 12 hours under an inert atmosphere, but in one embodiment, it is performed at about 350 to 450° C. for about 30 minutes to 2 hours. The reaction condition may be controlled depending upon the kind of functional group of the precursor. When the thermal rearrangement reaction is performed within the temperature and time ranges, it is possible to decrease the non-reacted precursor to improve the degree of purity.

As the result of the heat treatment, it is possible to provide polybenzimidazole represented by Chemical Formulae 1 to 3 from the alkaline-treated polypyrrolone represented by Chemical Formulae 7' to 9' in accordance with, for example, the following Reaction Scheme 3.

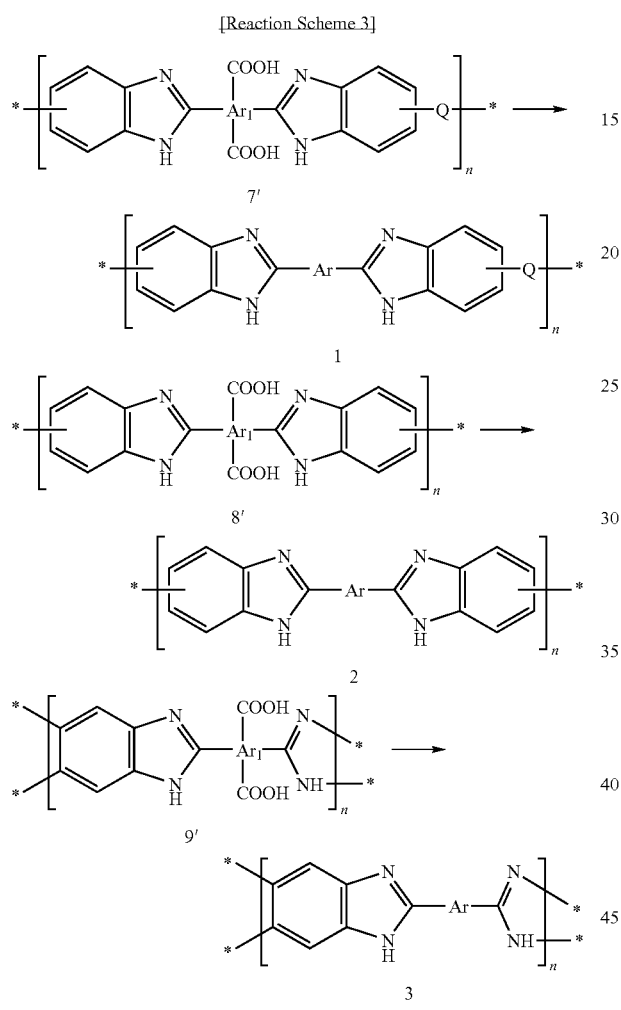

In the Reaction Scheme 3, $Ar_1$, Ar, Q and n are the same as in the above Chemical Formulae 4 to 6.

The conversion to polybenzimidazole represented by Chemical Formulae 1 to 3 can be accomplished by a de-carbon dioxide reaction in which 2 moles of $CO_2$ are removed from polybenzimidazoyl dicarboxylic acid represented by Chemical Formulae 7' to 9'.

Ar may be at least one selected from the group consisting of the following chemical formulae, wherein the binding position includes all of o-, m-, and p-.

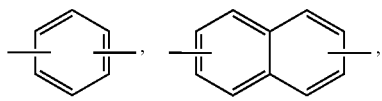

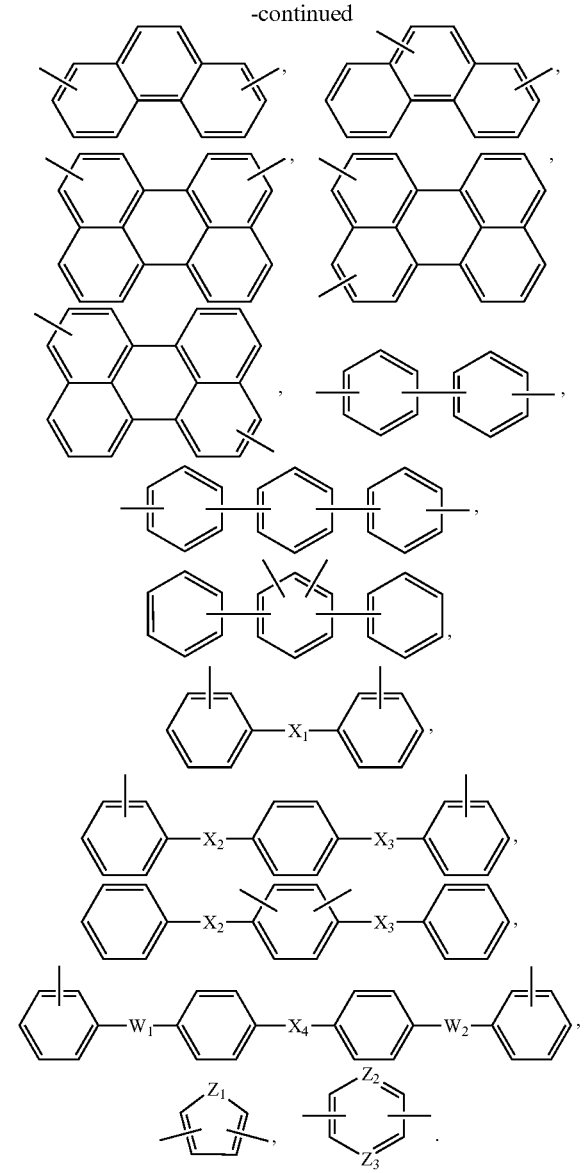

In the above chemical formulae, $X_1$, $X_2$, $X_3$, and $X_4$ are independently O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, or C(=O)NH, $W_1$ and $W_2$ are independently O, S, or C(=O), and $Z_1$ is O, S, $CR_1R_2$ or $NR_3$, where $R_1$, $R_2$, and $R_3$ are the same or different from each other and are independently hydrogen or a C1 to C5 alkyl group, and $Z_2$ and $Z_3$ are the same or different from each other and are independently N or $CR_4$ (where $R_4$ is hydrogen or a C1 to C5 alkyl group), provided that both $Z_2$ and $Z_3$ are not $CR_4$.

In one embodiment, Ar is selected from the following chemical formulae.

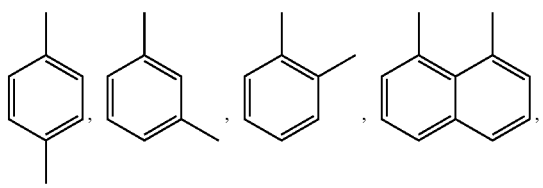

-continued

-continued
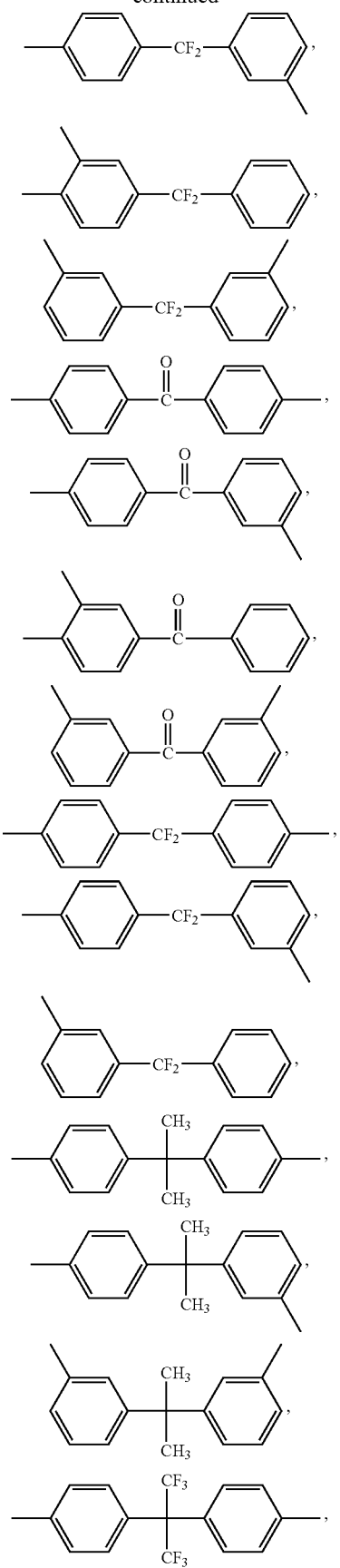
-continued
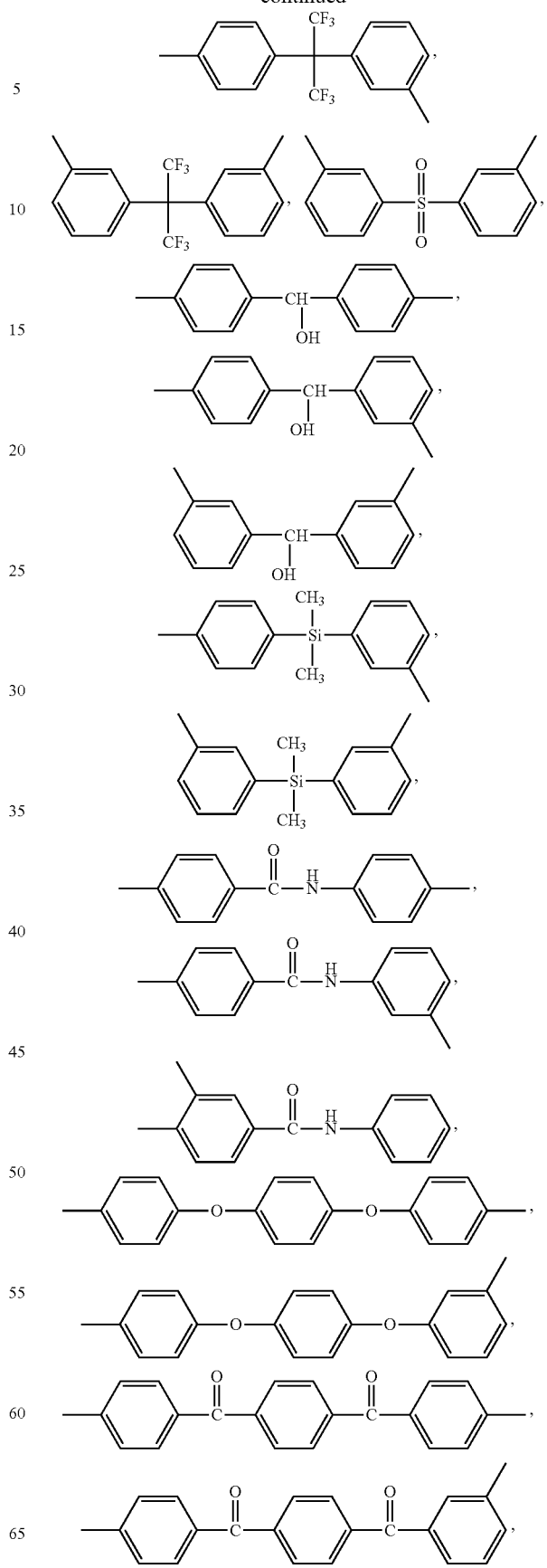

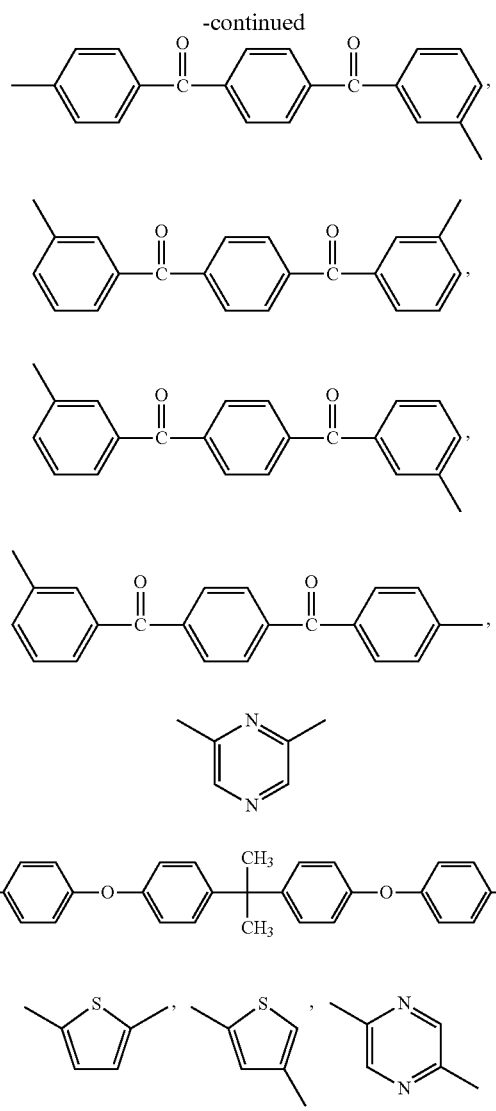

Q is selected from $C(CH_3)_2$, $C(CF_3)_2$, $C(=O)NH$, $C(CH_3)(CF_3)$, O, S, or $S(=O)_2$, and in one embodiment Q is preferably $C(CF_3)_2$.

The obtained polybenzimidazole may have a density of about 1.10 to 1.40 g/cm³, a fractional free volume (FFV) of about 0.22 to 0.35, and d-spacing that is measured by X-ray diffraction analysis of about 600 to 700 pm.

Figure 4:
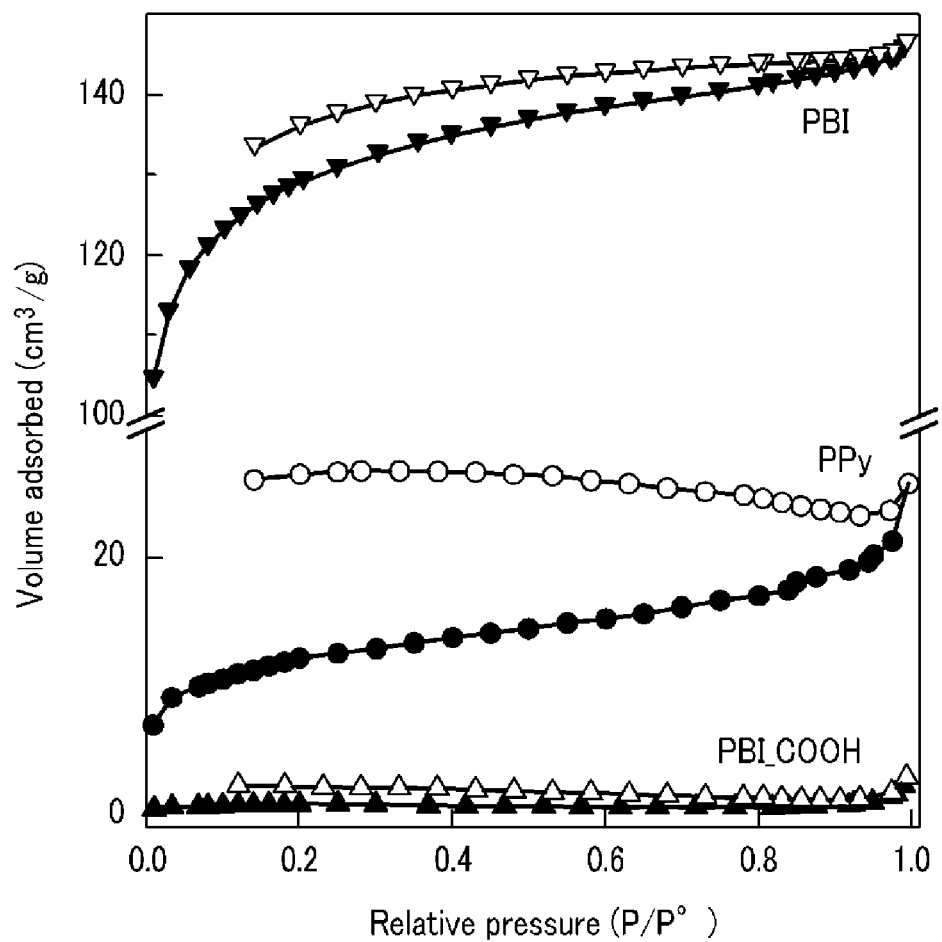
FIG. 4 shows $N_2$ adsorption and desorption isotherms of polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13.
Figure 5:
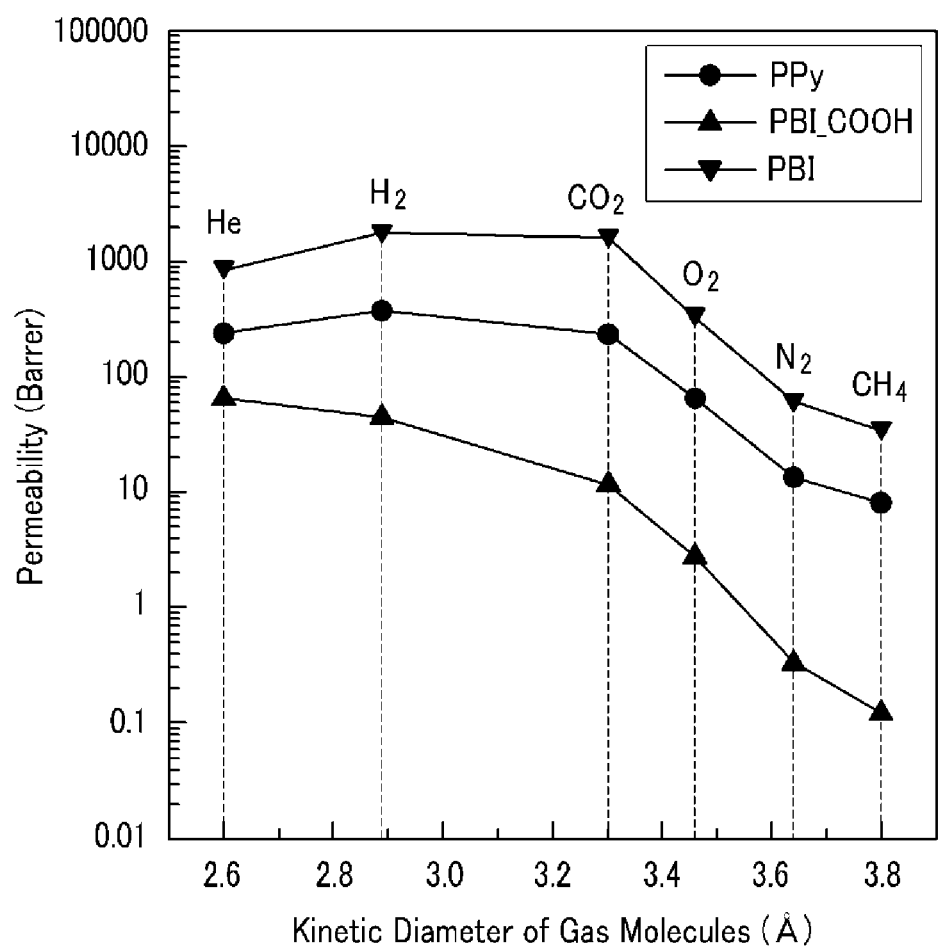
FIG. 5 is a graph showing permeabilities of polypyrrolone (PPy, ●) represented by Chemical Formula 11, polybenzimidazoyl dicarboxylic acid (PBI_COOH, ▲) represented by Chemical Formula 12, and polybenzimidazole (PBI, ▼) represented by Chemical Formula 13 according to kinetic diameters of gas molecules.

In the method of preparing polybenzimidazole according to one embodiment of the present invention, the degree of forming picopores of polypyrrolone (PPy) and polybenzimidazoyl dicarboxylic acid (PBI_COOH), which are intermediate, is significantly different from that of polybenzimidazole (PBI) which is a final product depending upon the reaction step. Referring to FIGS. 4 and 5, polypyrrolone has a low density and a high fractional free volume since picopores are formed within repeat units in the molecule. On the other hand, polybenzimidazoyl dicarboxylic acid obtained by alkaline-treating polypyrrolone rather decreases the fine porosity in the molecules since the morphology of the molecular structure of polypyrrolone precursor is transformed. However, polybenzimidazole produced by reheating the polybenzimidazoyl polypyrrolone may provide finer picopores than those of polypyrrolone molecules since the morphology of the molecular structure of the polybenzimidazoyl dicarboxylic acid precursor is further transformed, so the fine porosity in the molecules is further increased. This is confirmed by the results that the polybenzimidazole according to the present invention has remarkably decreased density, remarkably increased fractional free volume (FFV), and remarkably increased d-spacing compared to those of the polypyrrolone (PPy) precursor, and remarkably increased permeability to gas compared to that of polypyrrolone (PPy).

Such morphology characteristics are easily controlled by considering the characteristics of Ar and the Q functional group, for example, steric hindrance, so it is possible to control the gas permeability and the selectivity to all kinds of gases.

Polybenzimidazole represented by Chemical Formulae 1 to 3 is designed to have suitable molecular weight during the preparation step, and in one embodiment, it has a weight average molecular weight of about 10,000 to 200,000. When it has the ranged molecular weight, it is possible to provide a polymer with excellent solubility to the solvent and excellent physical properties.

EXAMPLES

Hereinafter, preferred examples will be provided for a further understanding of the invention. These examples are for illustrative purposes only and are not intended to limit the scope of the present invention.

Example 1

A polybenzimidazole (PBI) represented by Chemical Formula 13 was prepared in accordance with Reaction Scheme 4 as shown in the following.

[Reaction Scheme 4]

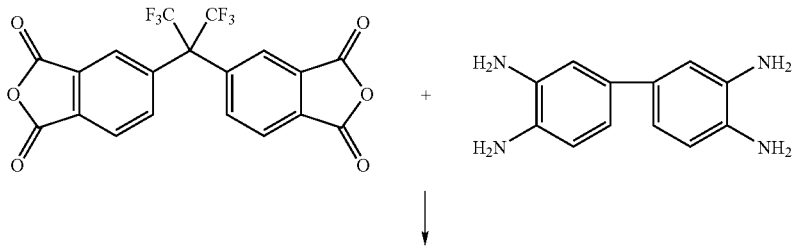

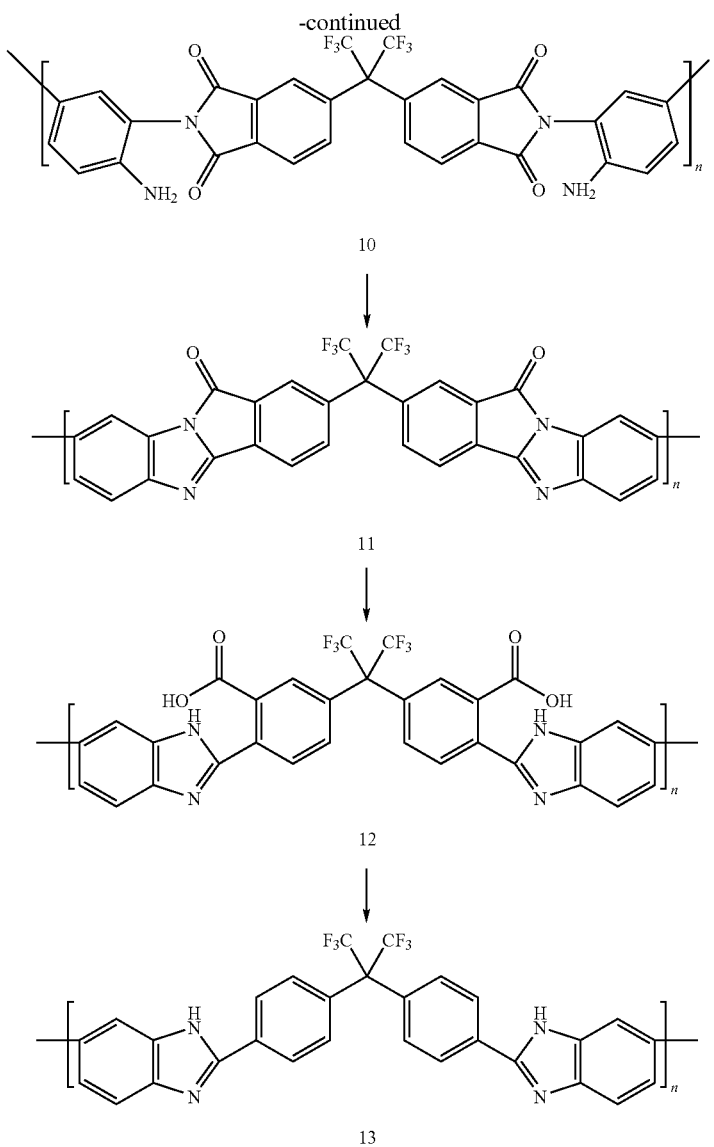

10

11

12

13

In Reaction Scheme 4, n refers to a polymerization degree. The polymer of the Chemical Formula 13 has a weight average molecular weight of 49,320.

1-1. Starting Materials 4,4'-(hexafluoroisopropylidene)diphthalic anhydride (6FDA, Tokyo Chemical Industry, Tokyo, Japan) and 3,3'-diaminobenzidine (DAB, Tokyo Chemical Industry, Tokyo, Japan) were used for starting materials. Each was dried at 180° C. and 80° C. in a vacuum oven. N-methyl pyrrolidinone (NMP) as a solvent was obtained from Aldrich (Milwaukee, Wis., USA), distilled under reduced pressure, and purified with 4 Å or more molecular sieves under a nitrogen atmosphere. Sodium hydroxide (NaOH) was purchased from Tokyo Kasei Co (Tokyo, Japan), and used without further purification.

1-2. Preparation of Polybenzimidazole

Polybenzimidazole (PBI) was prepared by sequentially performing polymerization, heat treatment, ring-opening by an alkaline solution, and heat treatment.

10 mmol of 3,3'-diaminobenzidine (DAB) and NMP were dissolved in a 3-neck round-bottom flask filled with NMP for 2 hours under a nitrogen purge. Before adding 4,4'-(hexafluoroisopropylidene)diphthalic anhydride, the resulting 3,3'-diaminobenzidine solution was heated at 60° C. for controlling the reaction rate of monomers. 10 mmol of 4,4'-(hexafluoroisopropylidene)diphthalic anhydride dissolved in 40 ml of NMP was dripped to a 3,3'-diaminobenzidine solution very slowly at 80° C. After the 4,4'-(hexafluoroisopropylidene)diphthalic anhydride was completely added to the 3,3'-diaminobenzidine solution, the poly(amino amic acid) solution was stirred for 12 hours.

The resulting poly(amino amic acid) solution was cast onto a glass plate and then thermally imidized to 250° C. under vacuum. Poly(amino imide) (PAI, Chemical Formula 10) films were detached from the glass plate and stored in a desiccator. This precursor film, which was cut to 2 cm×2 cm, was put between ceramic plates and thermally converted in a tubular furnace at 450° C. Polypyrrolone (PPy, Chemical Formula 11) film was obtained from conversion of polyaminoimide (PAI, Chemical Formula 10) at the ortho-position by dehydration. The polypyrrolone film was immersed in a 1 M NaOH solution at around 100° C. for 3 hours and was then rinsed in deionized water to obtain a polybenzimidazoyl dicarboxylic acid (PBI_COOH, Chemical Formula 12) film.

The rinsed film was subjected to thermal rearrangement in a tubular furnace at 450° C. to obtain a polybenzimidazole (PBI, Chemical Formula 13) film.

Example 2

A polybenzimidazole film of Chemical Formula 14 was fabricated in accordance with the same procedure as in Example 1, except that 3,3'-diaminobenzidine was substituted with 1,2,4,5-benzenetetraaminetetrahydrochloride.

[Chemical Formula 14]

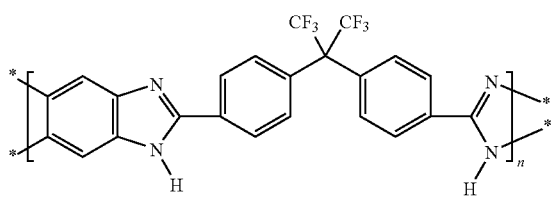

In the above Chemical Formula 14, n refers to a polymerization degree. The polymer of the Chemical Formula 14 has a weight average molecular weight of 42,480.

Example 3

A polybenzimidazole film of the following Chemical Formula 15 was fabricated in accordance with the same procedure as in Example 1, except that 3,3'-diaminobenzidine was substituted with 4,4-oxybis(1,2-benzene imidazole).

[Chemical Formula 15]

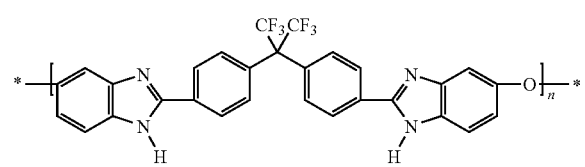

In the above Chemical Formula 15, n refers to a polymerization degree. The polymer of the Chemical Formula 15 has a weight average molecular weight of 50,760.

Example 4

A polybenzimidazole film of Chemical Formula 16 was fabricated in accordance with the same procedure as in Example 1, except that 3,3'-diaminobenzidine was substituted with 3,3',4,4'-tetraaminodiphenyl sulfone.

[Chemical Formula 16]

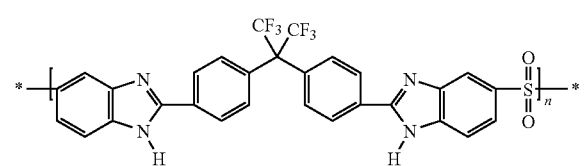

In the above Chemical Formula 16, n refers to a polymerization degree. The polymer of the Chemical Formula 16 has a weight average molecular weight of 54,080.

Comparative Example 1

A polypyrrolone film (PPy_450) of Chemical Formula 11 was fabricated in accordance with the same procedure as in Example 1, except that the thermal rearrangement caused by the alkaline treatment and the heat treatment were not carried out.

Comparative Example 2

A polypyrrolone film (PPy_300) was fabricated in accordance with the same procedure as in Comparative Example 1, except that the temperature when thermal-converting the polyaminoimide film to the polypyrrolone film was 300° C.

Comparative Example 3

A polypyrrolone film (PPy_350) was fabricated in accordance with the same procedure as in Comparative Example 1, except that the temperature of the thermal-converting the polyaminoimide film to the polypyrrolone film was 350° C.

Comparative Example 4

A polypyrrolone film (PPy_400) was fabricated in accordance with the same procedure as in Comparative Example 1, except that the temperature of the thermal-converting the polyaminoimide film to the polypyrrolone film was 400° C.

Comparative Example 5

A polybenzimidazole represented by the following Chemical Formula 17 was obtained in accordance with the same procedure as described in U.S. Patent Laid-Open Publication No. 2005-0272859. Poly-2,2'-phenylene-5,5'-dibenzimidazole having the trade name of Celazole™ was purchased from Celanese and pulverized with a grinder. It was completely dried and dissolved in an anhydrous dimethylacetamide solvent and heated, then agitated for 24 hours to provide a polybenzimidazole film of Chemical Formula 17.

[Chemical Formula 17]

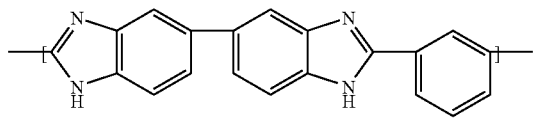

Comparative Example 6

Polybenzimidazole represented by the following Chemical Formula 18 was prepared in accordance with the procedure described in a reference [Kumbharkar, S. C., P. B. Karadkar, and U.K. Kharul, Enhancement of gas permeation properties of polybenzimidazoles by systematic structure architecture. Journal of Membrane Science, 2006. 286 1-2 p. 161-169]. Polybenzimidazole (PBI) represented by the following Chemical Formula 18 was prepared by reacting 4,4'-(hexafluoroisopropylidene)dibenzoic acid with 3,3'-diaminobenzidine in a polyphosphoric acid solvent at 200° C. for 11 hours to provide a solution with a desirable viscosity.

[Chemical Formula 18]

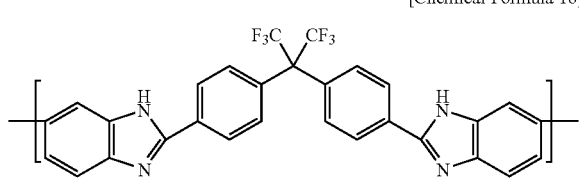

Experimental Example 1

ATR-FTIR Analysis

In order to confirm whether polybenzimidazole according to Example 1 was produced, ATR-FTIR spectrum was measured using an infrared microspectrometer (IlluminatIR, SensIR Technologies, Danbury, Conn., USA).

Figure 1B:
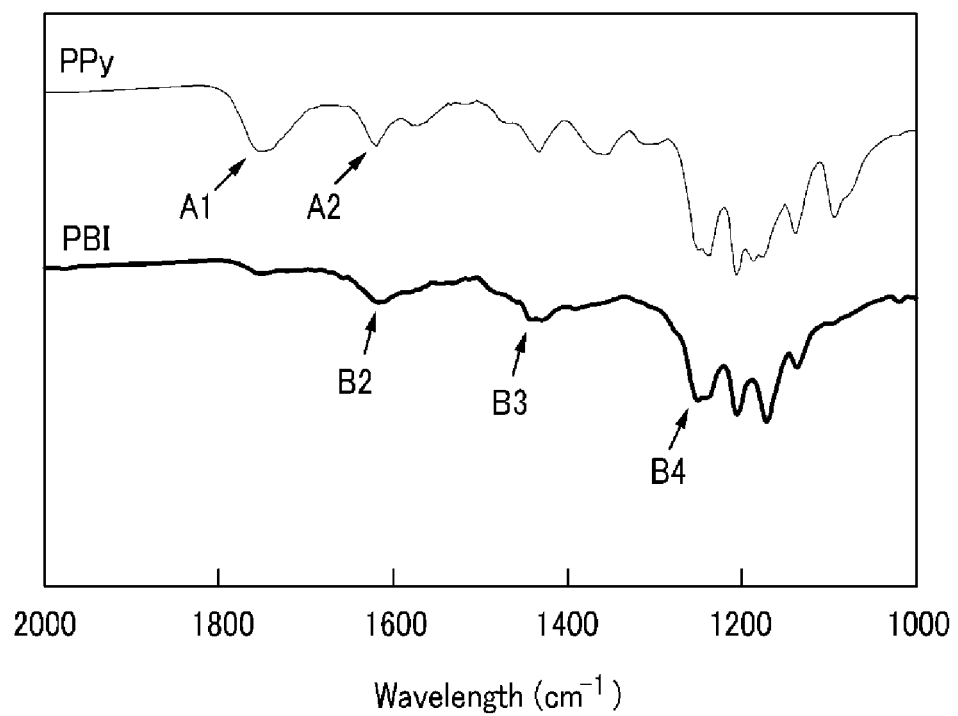
FIG. 1B is an enlarged graph of the "A" portion of FIG. 1A.

FIG. 1A is an ATR-FTIR spectrum of polyimidazopyrrolone (PPy) represented by Chemical Formula 11 and polybenzimidazole (PBI) represented by Chemical Formula 13, and FIG. 1B is a graph magnifying the "A" part of FIG. 1A.

Referring to FIG. 1A, it was observed that a 1758 $cm^{-1}$ (A1) absorption band due to C=O of pyrrolone structure and a 1620 $cm^{-1}$ (A2) absorption band due to C=N of pyrrolone structure were present in polyimidazopyrrolone (PPy) represented by Chemical Formula 11 (Sek, D. et al., Polymer, 1999. 40 26 p. 7303-7312). On the other hand, it is confirmed that polybenzimidazole (PBI) represented by Chemical Formula 13 was produced from the results obtained after performing the alkaline treatment and the heat treatment of polyimidazopyrrolone (PPy), which shows the presence of 3500-2500 $cm^{-1}$ (B1) absorption band showing free N—H elongation through a wide wavelength range.

In addition, referring to FIG. 1B, it is observed in the case of polybenzimidazole (PBI) that a plurality of absorption bands were present in 1575 $cm^{-1}$ (B2), 1441 $cm^{-1}$, 1411 $cm^{-1}$ (B3, inplane deformation), and 1263 $cm^{-1}$ (B4, breathing mode) besides the 3500-2500 $cm^{-1}$ (B1) absorption band. It is understood that these absorption bands result from the vibration of conjugate of benzene and imidazole rings (Asensio, J. A. et al., Journal of Polymer Science, Part A: Polymer Chemistry, 2002. 40 21 p. 3703-3710).

Experimental Example 2

Elemental Analysis

Polyaminoimide (PAI) represented by Chemical Formula 10, polypyrrolone (PPy) represented by Chemical Formula 11, and polybenzimidazole (PBI) represented by Chemical Formula 13 according to Example 1 were measured for elemental analysis to define chemical components. The elemental analysis was undertaken using an elemental analyzer (Flash EA 1112, CE Instruments, UK), and the obtained results are shown in the following Table 1.

Experimental Example 3

Thermogravimetric Analysis (TGA)

Thermogravimetric analysis (TGA) was performed to confirm the thermal rearrangement.

Thermogravimetric analysis is a method of measuring a weight change depending upon temperature to confirm whether it is thermally converted. In the present exemplary embodiment, polypyrrolone (PPy) and polybenzimidazole (PBI) released $H_2O$ and $CO_2$ which are side-products due to the thermal rearrangement, and the optimal temperature of completing the structure change and thermal rearrangement reaction through thermogravimetric analysis.

The thermogravimetric analysis was performed using a thermogravimetric analyzer (2950TGA, TA Instrument, USA) at a heating speed of 10° C./minute under a nitrogen atmosphere, and the results are shown in FIG. 2A to FIG. 2I.

FIG. 2A to FIG. 2I are graphs showing thermogravimetry changes of polyaminoimide (PAI) represented by Chemical Formula 10, polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13 depending upon temperature.

In the graph, it is confirmed that the part where a thermogravimetry change is observed shows the thermal rearrangement reaction.

Figure 2A:
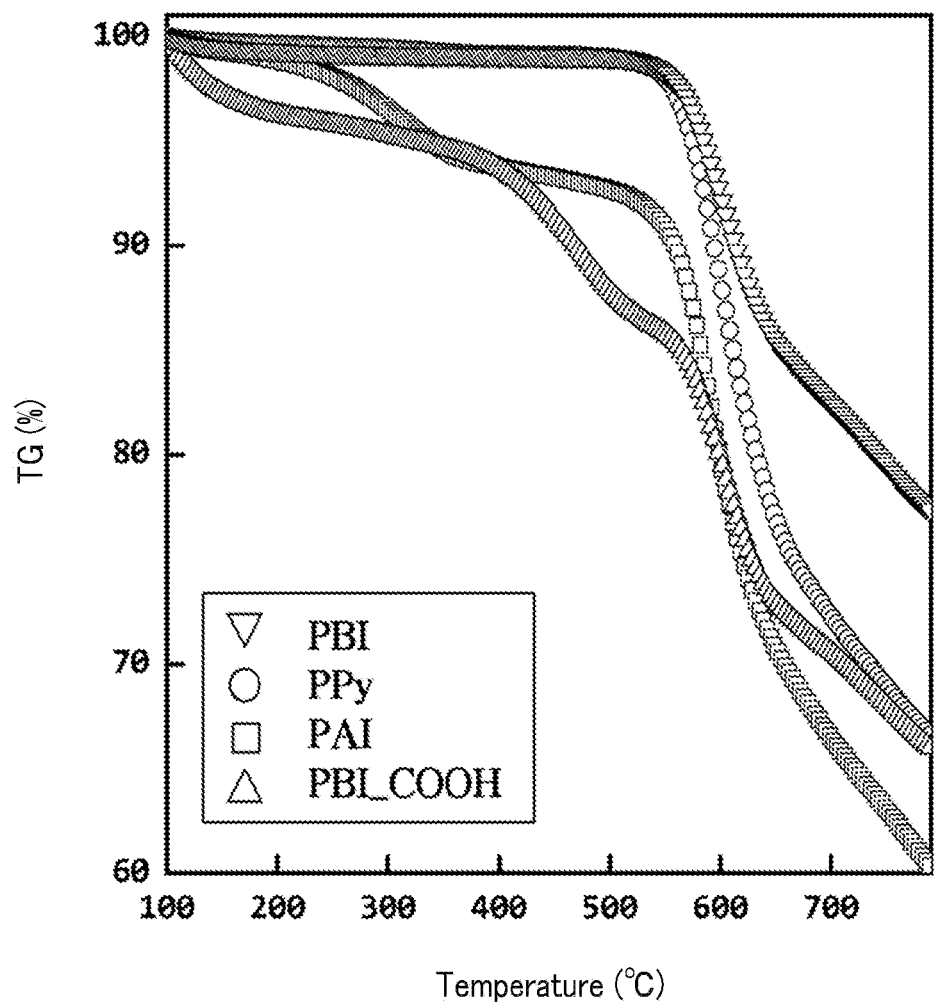
FIGS. 2A to 2I show thermogravimetric analyses of polyaminoimide (PAI) represented by Chemical Formula 10, polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13.
Figure 2B:
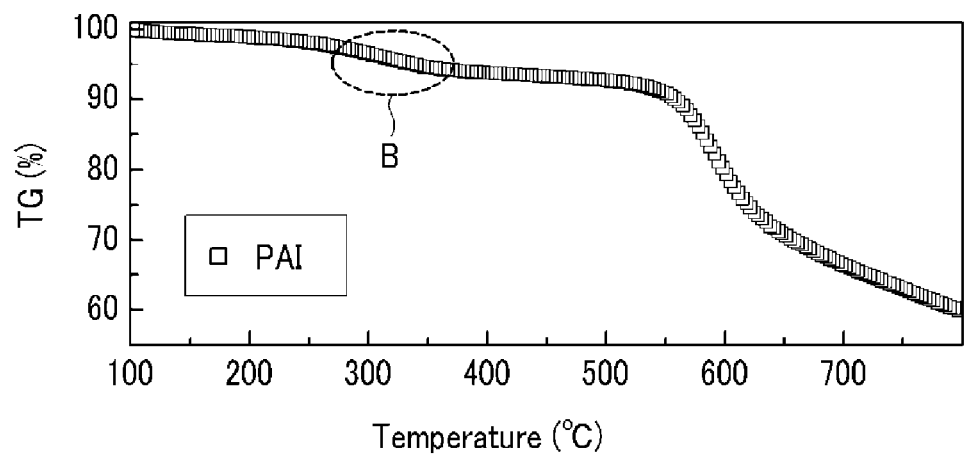
Figure 2C:
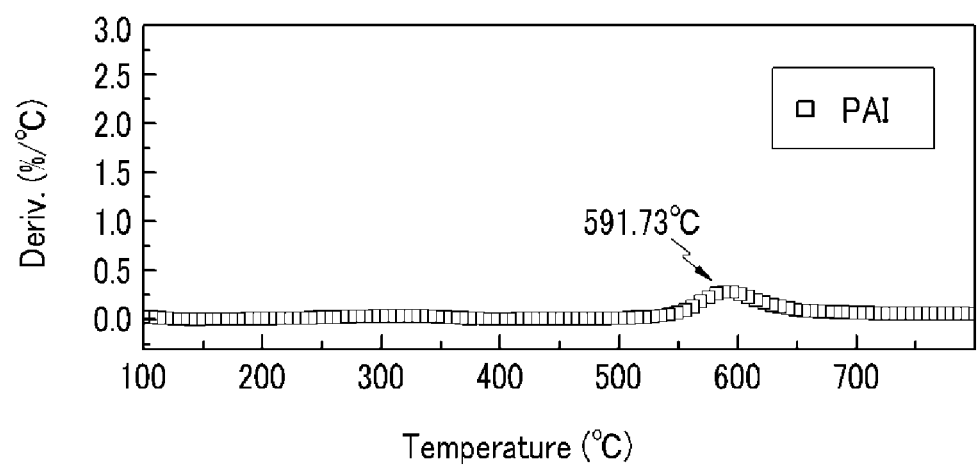
Figure 2D:
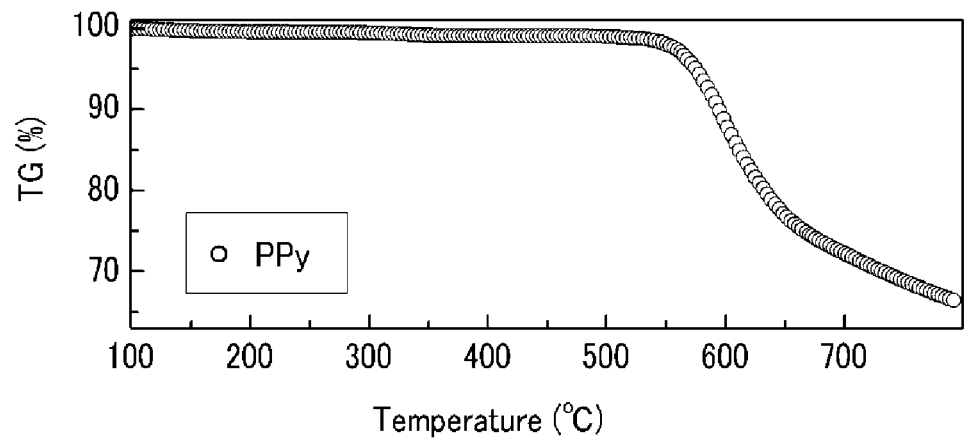
Figure 2E:
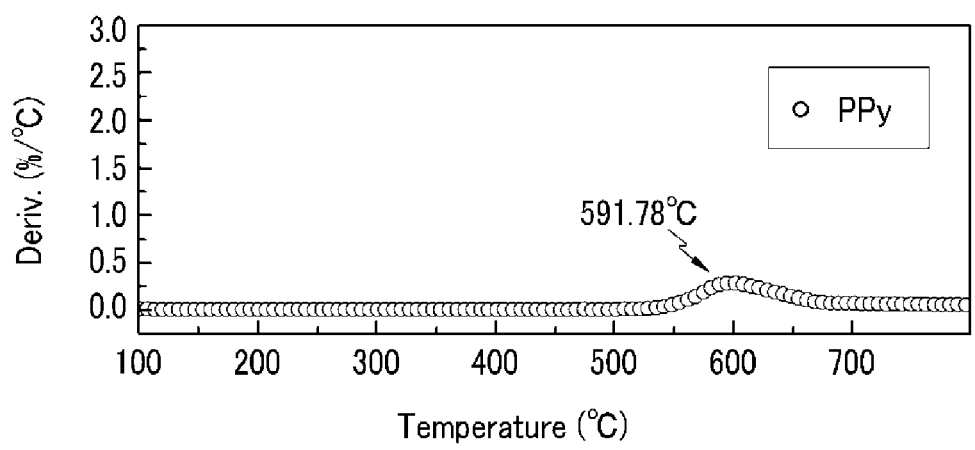

Referring to FIGS. 2A to 2C, in the case of polyaminoimide (PAI), $H_2O$ was released at 250 to 350° C. (the part of "B" in the figure) and the thermogravimetry change was the most at 591.73° C. In addition, referring to FIG. 2A, FIG. 2D, and FIG. 2E, it is found that polypyrrolone (PPy) maintained the thermogravimetry at relatively high temperature without releasing $H_2O$ and $CO_2$ and the highest thermogravimetry was found at 591.78° C.

Figure 2F:
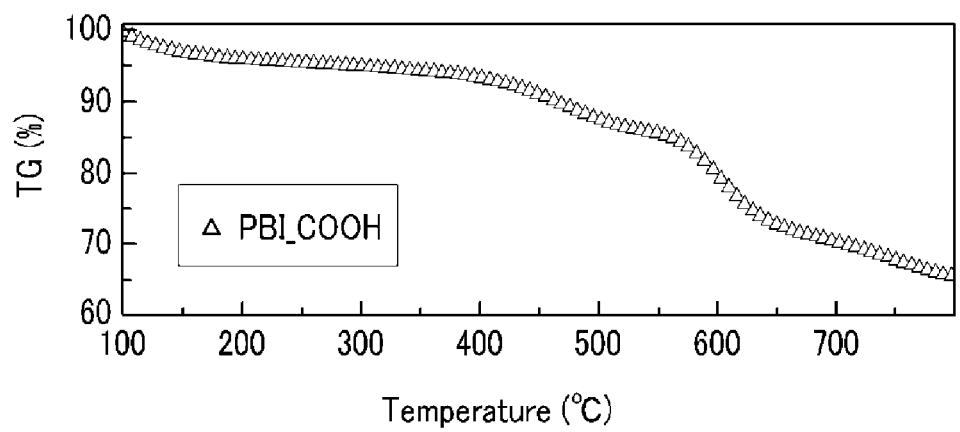
Figure 2G:
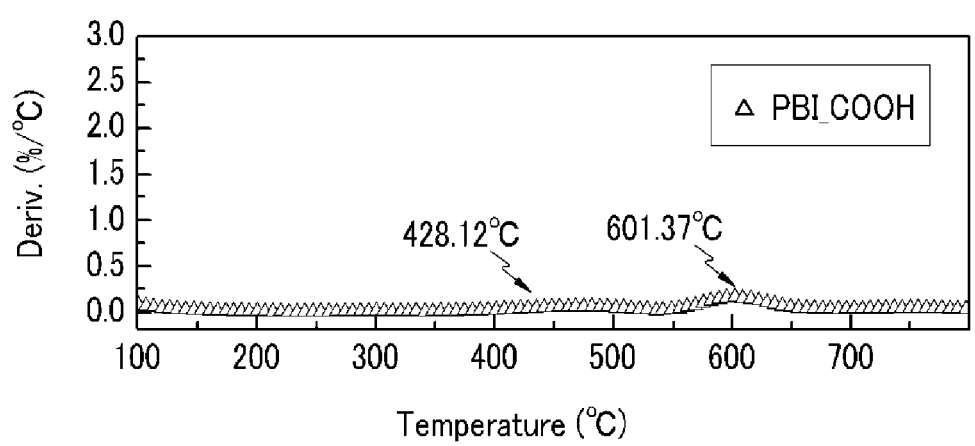

In addition, referring to FIG. 2A, FIG. 2F, and FIG. 2G, it is confirmed that polybenzimidazoyl dicarboxylic acid (PBI_COOH) released $H_2O$ at 428.12° C. and had the highest thermogravimetry change at 601.37° C.

Figure 2H:
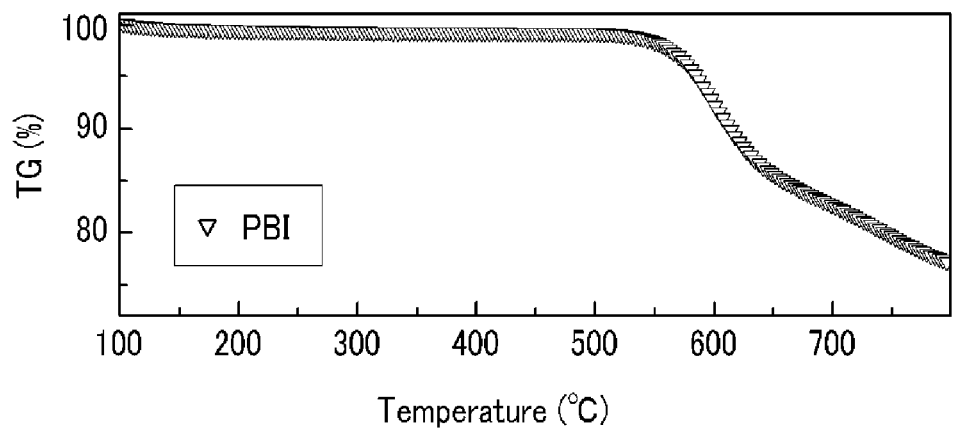
Figure 2I:
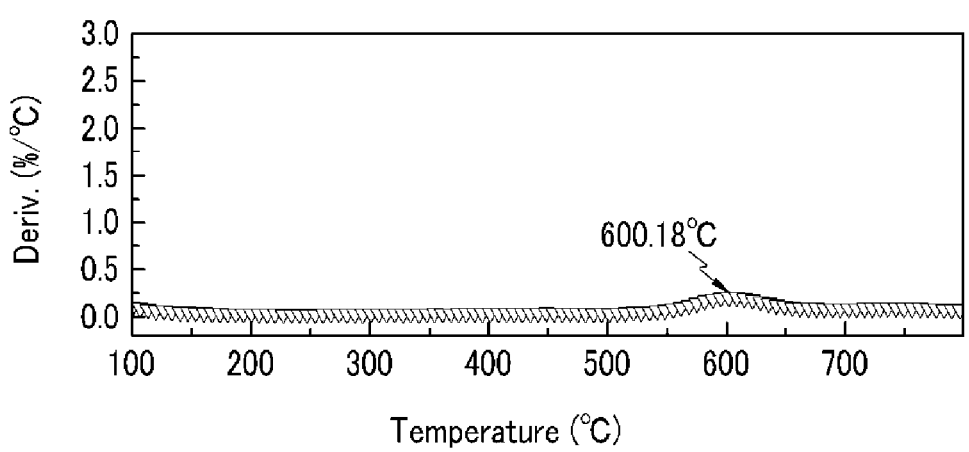

In addition, referring to FIG. 2A, FIG. 2H, and FIG. 2I, in the case of polybenzimidazole (PBI), the thermogravimetry is maintained without releasing $H_2O$ and $CO_2$ until a relatively high temperature, and the thermogravimetry change is the most at 600.18° C.

From the thermogravimetry analysis, the thermal converting temperature of each compound is confirmed, particularly, it is understood that polypyrrolone (PPy) having relatively excellent thermal stability was prepared from polyaminoimide (PAI), but polybenzimidazoyl dicarboxylic acid (PBI_COOH) obtained by the alkaline treatment generates a thermalgravimetry change at a temperature lower than the thermal conversation temperature of polypyrrolone (PPy). It is found that the compound structure is changed due to the alkaline treatment, which affects the thermal stability.

TABLE 1

|  | Chemical Formula | C (wt %) | H (wt %) | N (wt %) | O (wt %) | F (wt %) |
| --- | --- | --- | --- | --- | --- | --- |
| polyaminoimide | ($C_{31}H_{16}N_4O_4F_6$) | 56.7 | 2.7 | 8.4 | 22.3 | 16.7 |
| (Chemical Formula 10) |  | 59.8* | 2.6* | 9.0* | 10.3* | 18.3* |
| polypyrrolone | ($C_{31}H_{12}N_4O_2F_6$) | 62.2 | 2.0 | 9.4 | 13.4 | 17.5 |
| (Chemical Formula 11) |  | 63.5* | 2.1* | 9.6* | 5.5* | 19.4* |
| polybenzimidazole | ($C_{29}H_{16}N_4F_6$) | 59.1 | 2.0 | 8.9 | 9.9 | 20.0 |
| (Chemical Formula 13) |  | 65.2* | 3.0* | 10.5* | 0.0* | 21.3* |

*theoretical calculation value

On the other hand, polybenzimidazole (PBI) obtained after heating polybenzimidazoyl dicarboxylic acid (PBI_COOH) had higher thermal stability than that of polypyrrolone (PPy) as well as that of polybenzimidazoyl dicarboxylic acid (PBI_COOH).

From the result, it is understood that polypyrrolone (PPy) obtained through the alkaline treatment and the heat treatment further improved the thermal stability by thermal rearrangement.

TGA analysis confirms that polypyrrolone and polybenzimidazole had significantly high thermal stability since the thermogravimetry is rarely lost until 600° C. Particularly, it is understood that polybenzimidazole (PBI) had much better thermal stability than that of polypyrrolone (PPy) since the thermogravimetry thereof was maintained by about 80% or more even at a temperature of around 700° C. or more.

On the other hand, the highest char yield at 800° C. was of 72.7% in polybenzimidazole (PBI), followed by polypyrrolone (PPy), polybenzimidazoyl dicarboxylic acid (PBI_COOH), and polyaminoimide (PAI) in that order. From the results, the inherent thermal stability of polybenzimidazole (PBI) was confirmed (Tsur, Y. et al., Journal of Polymer Science Part A-1 Polymer Chemistry, 1974. 12 7 p. 1515-1529).

Experimental Example 4

X-ray Diffraction Pattern Analysis

Each morphology for polyaminoimide (PAI) represented by Chemical Formula 10, polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13 was measured by performing wide-angle X-ray diffraction (WAXD) analysis. The analysis was performed using an X-ray diffraction analyzer (Rigaku Denki model RAD-C, Rigaku, Tokyo, Japan). The diffraction analyzer was operated in 2θ of 5 to 300 at a scanning speed of 5°/minute.

A d-spacing level was obtained by calculating the X-ray diffraction pattern results in accordance with Bragg's equation, and the results are shown in the following Table 2 and in FIG. 3.

Figure 3:
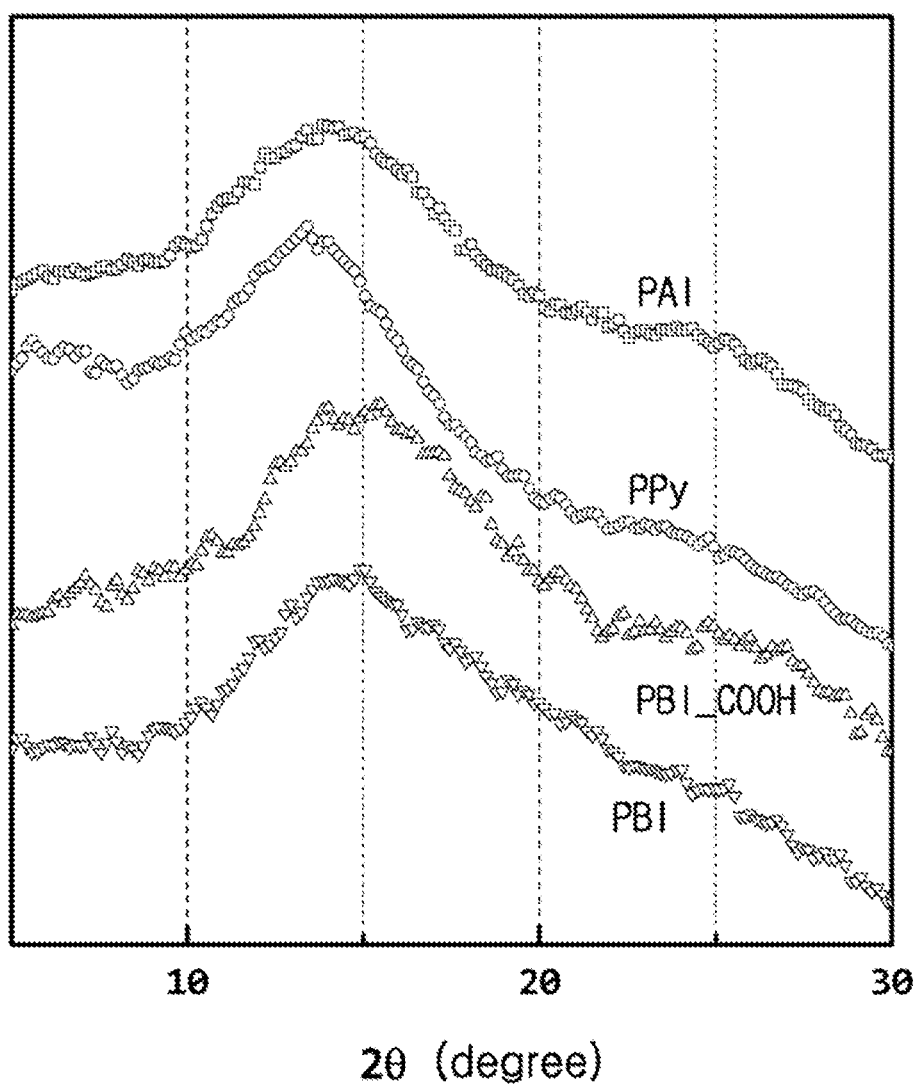
FIG. 3 shows X-ray diffraction analysis patterns of polyaminoimide (PAI) represented by Chemical Formula 10, polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13 in Example 1.

FIG. 3 is a graph showing X-ray diffraction analysis patterns of polyaminoimide (PAI) represented by Chemical Formula 10, polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13 according to Example 1.

Referring to FIG. 3, it is found that each compound had an amorphous structure instead of a crystalline structure since it shows a relatively broad pattern. In addition, after thermally converting polyaminoimide (PAI) to polypyrrolone (PPy) and thermally converting polybenzimidazoyl dicarboxylic acid (PBI_COOH) to polybenzimidazole (PBI), it was observed that the peak center was moved to a lower 2θ value.

TABLE 2

| | 2θ (degree) | d-spacing (pm) |
|---|---|---|
| polyaminoimide [Chemical Formula 10] | 14.7 | 600 |
| polypyrrolone [Chemical Formula 11] | 13.9 | 630 |
| polybenzimidazoyl dicarboxylic acid [Chemical Formula 12] | 15.4 | 570 |

TABLE 2-continued

| | 2θ (degree) | d-spacing (pm) |
|---|---|---|
| polybenzimidazole [Chemical Formula 13] | 13.8 | 640 |

Referring to Table 2, the d-spacing level was increased after the thermal rearrangement. The results mean that the thermal rearrangement affected the distance between chains in molecules due to the morphology change of the polymer sample, and the increased d-spacing affected on the porous fractional free volume where a small gas molecule is passed. Accordingly, it is estimated that polybenzimidazole obtained from the thermal rearrangement in solid state increased the fractional free volume through 2 moles of de-carbon dioxide ($CO_2$) and decreased the density.

Experimental Example 5

Fractional Free Volume Analysis

Polyaminoimide (PAI) represented by Chemical Formula 10, polypyrrolone (PPy) represented by Chemical Formula 11, polybenzimidazoyl dicarboxylic acid (PBI_COOH) represented by Chemical Formula 12, and polybenzimidazole (PBI) film represented by Chemical Formula 13 according to Example 1 were measured for physical properties, and the results are shown in the following Table 3. The fractional free volume, which is an inherent characteristic of polymers, is an important factor showing the permeability characteristics of polymers.

First, the density was measured in accordance with a buoyancy method using a Sartorius LA 120S analytical balance; the fractional free volume (FFV, Vf) was calculated with the results in accordance with Equation 1 [W. M. Lee. Selection of barrier materials from molecular structure. Polym Eng Sci. 1980; 20:65-9].

$$FFV = \frac{V - 1.3V_w}{V} \quad \text{[Equation 1]}$$

In the above Equation 1, V is a specific volume of polymer, and Vw is Van der Waals specific volume. The Van der Waals volume was determined by the Cerius 4.2 program using a synthia module based on the research disclosed in the reference [J. Bicerano. Prediction of polymer properties, Third Edition. Marcel Dekker Inc. 2002].

The glass polymer had a limited fractional free volume of less than 0.2, and the rubbery polymer such as polydimethyl siloxane and polyurethane had excellent fractional free volume. However, it has been reported that the glass polymer such as PTMSPs and PIMs also had improved fractional free volume due to the porous structure, and the polymer obtained by thermal rearrangement had an excellent fractional free volume due to the fine pores formed by thermal-converting the solid polymer structure.

TABLE 3

| | Density (g/cm³) | Volume (V, cm³/g) | $V_w$ (cm³/g) | FFV ($V_f$) |
|---|---|---|---|---|
| polyaminoimide [Chemical Formula 10] | 1.475 | 0.678 | 0.432 | 0.172 |
| polypyrrolone [Chemical Formula 11] | 1.406 | 0.711 | 0.393 | 0.282 |
| polybenzimidazoyl dicarboxylic acid [Chemical Formula 12] | 1.512 | 0.662 | 0.419 | 0.177 |

TABLE 3-continued

| | Density (g/cm$^3$) | Volume (V, cm$^3$/g) | V$_w$ (cm$^3$/g) | FFV (V$_f$) |
|---|---|---|---|---|
| polybenzimidazole [Chemical Formula 13] | 1.262 | 0.792 | 0.427 | 0.300 |

Referring to Table 3, polybenzimidazole decreased the density after the thermal rearrangement reaction, which means that it had high d-spacing level and high fractional free volume. As described in Experimental Example 2, polypyrrolone and polybenzimidazole had similar d-spacing levels, but polybenzimidazole had a remarkably low density, which means that it had higher fractional free volume compared to that of polypyrrolone. It is understood that pore volume was increased in the polybenzimidazole molecule through the alkaline treatment and the thermal rearrangement reaction.

Experimental Example 6

N$_2$ Adsorption and Desorption Isothermal Characteristic Analysis

N$_2$ adsorption/desorption characteristics of polybenzimidazole according to the present invention was measured to determine the pore characteristics. An N$_2$ adsorption isothermal curve of polybenzimidazole film was measured according to the BET (Brunauer, Emmett, Teller) method, and the results are shown in FIG. 4. The N$_2$ adsorption isothermal curve of polybenzimidazole film was measured using a Micrometrics ASAP 2020 surface area and porosity analyzer (Atlanta, USA) at 77 K, and was calculated in the BET adsorption isothermal formula.

As above, the pore characteristics of polybenzimidazole film were analyzed by an N$_2$ adsorption/desorption isothermal curve.

FIG. 4 is an N$_2$ adsorption/desorption isothermal curve of polypyrrolone (PPy) represented by Chemical Formula 11, polybenzimidazoyl dicarboxylic acid (PBI_COOH) represented by Chemical Formula 12, and polybenzimidazole (PBI) represented by Chemical Formula 13 according to Example 1.

In FIG. 4, ● refers to the adsorption isothermal curve of polypyrrolone (PPy); ○ refers to the desorption isothermal curve of polypyrrolone (PPy); ▼ refers to the absorption isothermal curve of polybenzimidazole (PBI); ∇ refers to the desorption isothermal curve of polybenzimidazole (PBI); ▲ refers to the adsorption isothermal curve of polybenzimidazoyl dicarboxylic acid (PBI_COOH); and Δ refers to the desorption isothermal curve of polybenzimidazoyl dicarboxylic acid (PBI_COOH).

Referring to FIG. 4, the isothermal curve can be broadly classified into six categories according to IUPAC reference basis, and the N$_2$ adsorption/desorption isothermal curve has the similar pattern to Type I and Type IV. Polybenzimidazole (PBI) had the highest adsorption volume, and the surface area (447 m$^2$/g at P/Po=0.2) was higher by about 10 times than that of polypyrrolone (42.4 m$^2$/g).

Thereby, it was thermally rearranged in the structure by converting into polypyrrolone (PPy), polybenzimidazoyl dicarboxylic acid (PBI_COOH), and polybenzimidazole (PBI) by the alkaline treatment and the heat treatment, so the resultant polybenzimidazole (PBI) had more pores than polypyrrolone (PPy) to provide a high gas adsorption capability.

Experimental Example 7

Measurement of Permeability and Permselectivity

Gas permeability and permselectivity of polybenzimidazole film were measured as follows.

The gas permeability for the single gasses of He, H$_2$, CO$_2$, O$_2$, N$_2$, and CH$_4$ were measured in accordance with the time-lag method in which the temperature was changed under a pressure of 760 Torr, and the permselectivity to O$_2$/N$_2$, CO$_2$/N$_2$, H$_2$/N$_2$, H$_2$/CO$_2$, H$_2$/CH$_4$, N$_2$/CH$_4$, and CO$_2$/CH$_4$ mixed gas pairs was determined by calculating the permeability ratio to the single gas. The results are shown in the following Table 4 and in FIG. 5.

FIG. 5 is a graph showing each permeability of polypyrrolone (PPy, ●) represented by Chemical Formula 11, polybenzimidazoyl dicarboxylic acid (PBI_COOH, ▲) represented by Chemical Formula 12, and polybenzimidazole (PBI, ▼) represented by Chemical Formula 13 according to Example 1.

Referring to FIG. 5, the permeability to each gas molecule was shown in the order of H$_2$>He>CO$_2$>O$_2$>N$_2$>CH$_4$. However, the dynamic diameter of gas molecules was He (2.66 Å)<H$_2$ (2.89 Å)<CO$_2$ (3.36 Å)<O$_2$ (3.46 Å)<N$_2$ (3.64 Å)<CH$_4$ (3.8 Å). The sequence difference between the permeability and the dynamic diameter is easily understood by separating the permeability into diffusion (D) which is a dynamic factor and solubility (S) which is a thermodynamic factor (Suda, H et al., Journal of Physical Chemistry B, 1997. 101 20 p. 3988-3994.). The dynamic diameter of H$_2$ is larger than that of He, the diffusion rate of H$_2$ is smaller than that of He, and the solubility of H$_2$ is higher than that of He. Accordingly, H$_2$ has the largest permeability to pass a polymer matrix.

Polybenzimidazoyl dicarboxylic acid (PBI_COOH) had higher permeability of He than the permeability of H$_2$, which means that the permeability of He had a different pattern than that of H$_2$. The results are understood by seeing the solubility which is chemical compatibility and the condensation degree of gas to the polymer (Orme, C. J. et al., Journal of Membrane Science, 2001. 186 2 p. 249-256). The solubility for H$_2$ after performing the alkaline treatment to polypyrrolone was significantly lower than that for He.

Polybenzimidazoyl dicarboxylic acid (PBI_COOH) also had significantly lower permeability than other polymer samples. Polypyrrolone (PPy) and polybenzimidazole (PBI) obtained from the thermal rearrangement reaction exhibited higher permeability than polyaminoimide (PAI) and polybenzimidazoyl dicarboxylic acid (PBI_COOH), of which polybenzimidazole (PBI) had the highest permeability.

TABLE 4

| | Chemical Formula 10 PAI_250 | Comparative Example 2 PPy_300 | Comparative Example 3 PPy_350 | Comparative Example 4 PPy_400 | Chemical Formula 11 PPy_450 | Chemical Formula 12 PBI_COOH |
|---|---|---|---|---|---|---|
| Permeability (unit: Barrer) | | | | | | |
| He | 36 | 183 | 155 | 189 | 240 | 65 |
| H$_2$ | 36 | 207 | 206 | 248 | 376 | 44 |

TABLE 4-continued

|  | Chemical Formula 10 PAI_250 | Comparative Example 2 PPy_300 | Comparative Example 3 PPy_350 | Comparative Example 4 PPy_400 | Chemical Formula 11 PPy_450 | Chemical Formula 12 PBI_COOH |
|---|---|---|---|---|---|---|
| $CO_2$ | 24 | 73 | 82 | 126 | 234 | 11 |
| $O_2$ | 3 | 23 | 32 | 34 | 65 | 3 |
| $N_2$ | 0.7 | 4 | 14 | 7 | 13 | 0.3 |
| $CH_4$ | 0.3 | 2 | 6 | 4 | 8 | 0.1 |
| Selectivity |  |  |  |  |  |  |
| $O_2/N_2$ | 4.1 | 5.9 | 2.3 | 5.2 | 4.9 | 8.3 |
| $CO_2/N_2$ | 35.3 | 19.1 | 5.8 | 19.0 | 17.6 | 34.0 |
| $H_2/N_2$ | 51.4 | 53.7 | 14.6 | 37.5 | 28.2 | 133.0 |
| $H_2/CO_2$ | 1.5 | 2.8 | 2.5 | 2.0 | 1.6 | 3.9 |
| $H_2/CH_4$ | 133.0 | 98.0 | 35.0 | 63.6 | 46.7 | 365.0 |
| $N_2/CH_4$ | 2.6 | 1.8 | 2.4 | 1.7 | 1.7 | 2.7 |
| $CO_2/CH_4$ | 91.5 | 34.8 | 14.0 | 32.3 | 29.0 | 93.1 |

Referring to Table 4, polybenzimidazole had hydrogen permeability of 1779 Barrer (1 Barrer=$1\times10^{-10}$ $cm^3$ (STP) cm/$cm^2$ s cmHg), and $H_2/CH_4$ selectivity of 50.5; on the other hand, polypyrrolone (PPy_450) had hydrogen selectivity of 376 Barrer and $H_2/CH_4$ selectivity of 46.7.

As mentioned above, it concisely corresponded to the results of d-spacing, fractional free volume, and nitrogen adsorption/desorption isothermal curve. Permeability of polybenzimidazole had less selectivity loss and was higher than the permeability of polypyrrolone after performing three treatments including the alkaline treatment and the heat treatments before and after the alkaline treatment.

Particularly, polybenzimidazole (PBI) had excellent gas permeability to the gases having a small size such as $H_2$, $CO_2$, and $O_2$ compared to that of polypyrrolone (PPy). Accordingly, referring to the results and the reference (Park, H. B. et al., Science, 2007. 318 5848 p. 254-258), it is confirmed that the thermal rearrangement reaction that is heated in the solid state was a preferable method for forming fine picopores that are well connected in the polymer matrix.

The following Table 5 shows the gas permeability data comparing the conventional polybenzimidazole to polybenzimidazole obtained by the present inventional method. U.S. Patent Laid-Open Publication No. 2005-0272859 reported the gas permeability of $H_2$, $CO_2$, $O_2$, $N_2$, and $CH_4$ at 30° C. as the gas permeability data related to the conventional polybenzimidazole.

TABLE 5

|  | Comparative Example 5 | Comparative Example 6 | Example 1 [Chemical Formula 13] |
|---|---|---|---|
| Permeability (P)[a] |  |  |  |
| $P_{H2}$ | 3.9 | 0.6 | 1779 |
| $P_{CO2}$ | 0.07 | 0.16 | 1624 |
| $P_{O2}$ | 0.086 | 0.015 | 337 |
| $P_{N2}$ | 0.049 | 0.0048 | 62 |
| $P_{CH4}$ | 0.004 | 0.0018 | 35 |
| Selectivity ($P_A/P_B$) |  |  |  |
| $P_{O2}/P_{N2}$ | 1.8 | 3.1 | 5.4 |
| $P_{CO2}/P_{N2}$ | 1.4 | 33 | 26.2 |
| $P_{H2}/P_{N2}$ | 80 | 131 | 28.7 |
| $P_{H2}/P_{CO2}$ | 56 | 3.8 | 1.1 |
| $P_{H2}/P_{CH4}$ | 98 | 350 | 50.5 |
| $P_{N2}/P_{CH4}$ | 12 | 2.7 | 1.8 |
| $P_{CO2}/P_{CH4}$ | 1.8 | 89 | 46.1 |

[a]1 bar, measured at 25° C.

Referring to Table 5, it is understood that polybenzimidazole obtained by the method of the present invention according to Example 1 had remarkably improved gas permeability compared to polybenzimidazole (Comparative PBI) obtained by the conventional method according to Comparative Example 5 and Comparative Example 6.

Figure 6A:
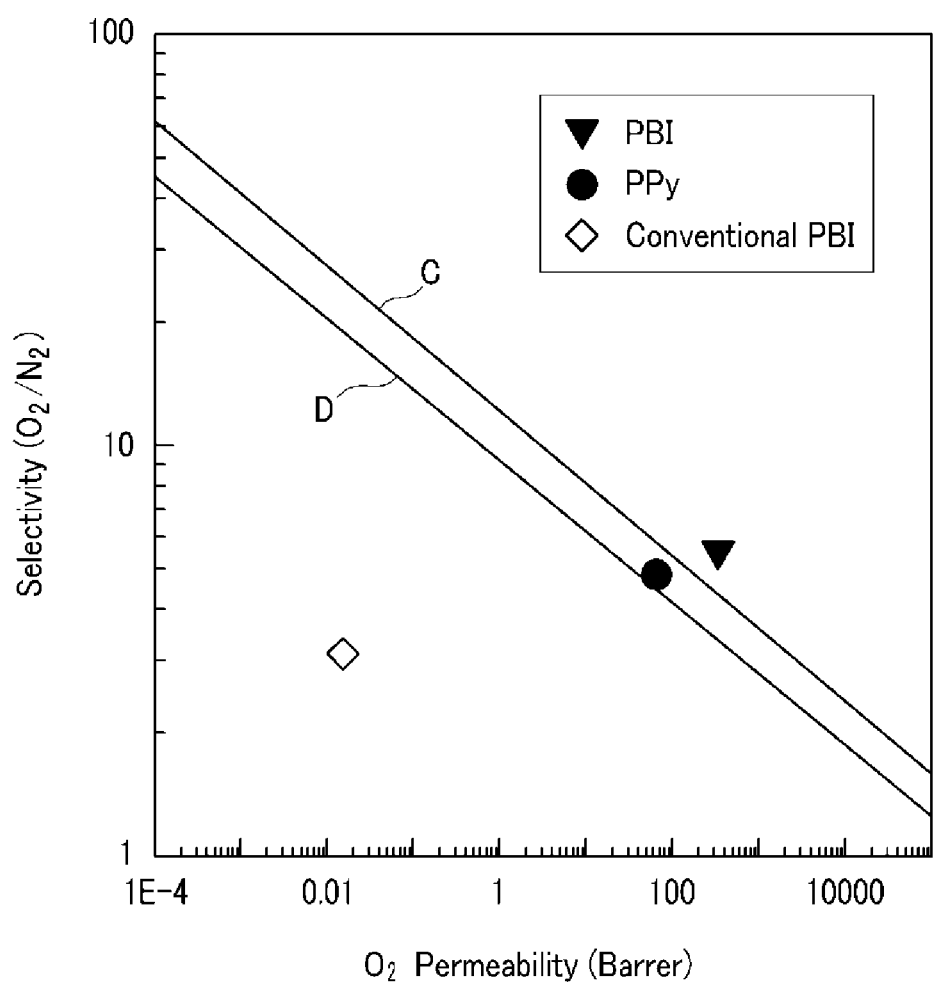
FIGS. 6A and 6B are graphs showing a relationship between $O_2$ permeability and $O_2/N_2$ selectivity, and a relationship between $CO_2$ permeability and $CO_2/CH_4$ selectivity of polybenzimidazole (PBI) represented by Chemical Formula 13 according to Example 1, and polypyrrolone (PPy_450) represented by Chemical Formula 12 according to Comparative Example 1, respectively.
Figure 6B:
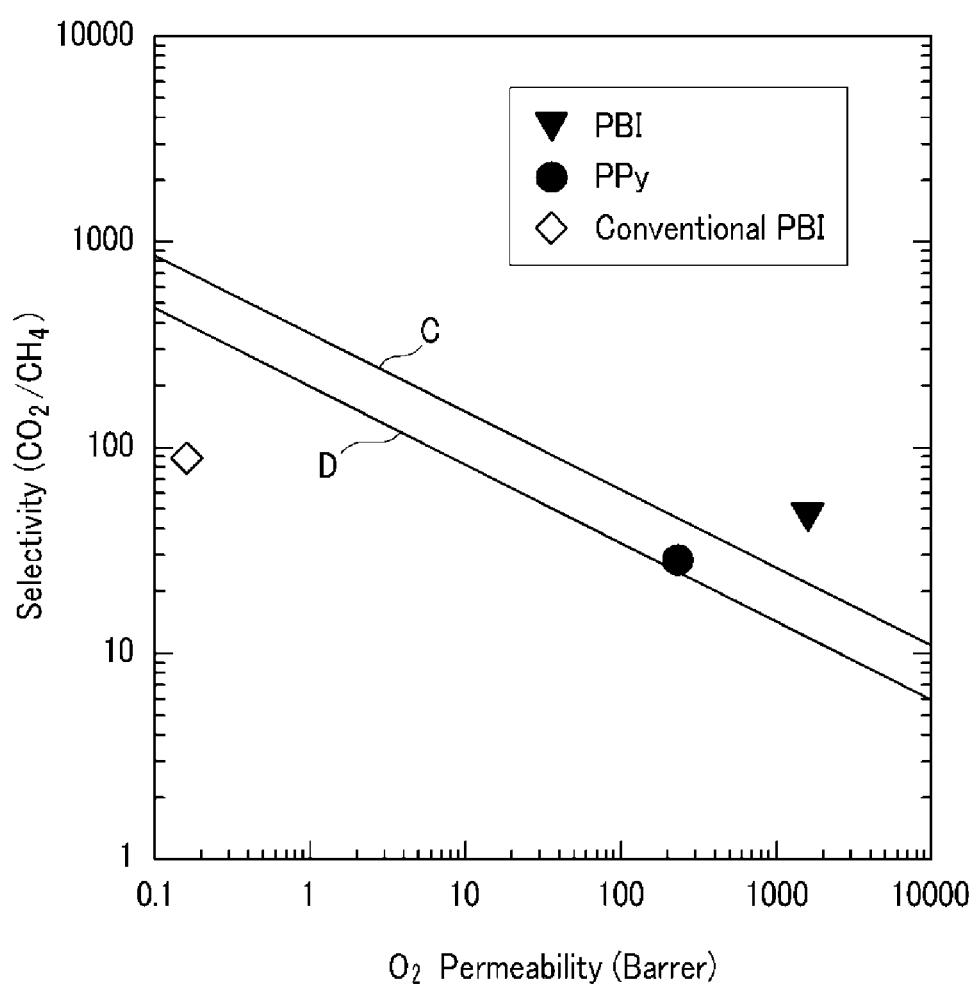

FIG. 6A and FIG. 6B are graphs showing the relationships between $O_2$ permeability and $O_2/N_2$ selectivity (FIG. 6A) of polybenzimidazole (PBI) represented by Chemical Formula 13 according to Example 1 and polypyrrolone (PPy_450) represented by Chemical Formula 12 according to Comparative Example 1 and the relationships between $CO_2$ permeability and $CO_2/CH_4$ selectivity (FIG. 6B) thereof. FIG. 6A and FIG. 6B shows an upper bound line suggested by Robeson in 2008 (Robeson, L. M. et al., Journal of Membrane Science, 2008. 320 1-2 p. 390-400). In FIG. 6A and FIG. 6B, C stands for the upper bound line recalculated and newly reported in 2007, and D stands for the upper bound line calculated in 1991.

Referring to FIG. 6A and FIG. 6B, polybenzimidazole (PBI) of the present invention had superior permeability and selectivity to those of conventional polybenzimidazole (comparative PBI) and polypyrrolone (PPy) obtained by the conventional method without performing the alkaline treatment and the heat treatment, and polybenzimidazole (PBI) of the present invention compassed the upper bound line. From the results, it is understood that the gas was effectively separated through picopores produced by the thermal rearrangement due to the alkaline treatment and the heat treatment before and after the alkaline treatment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of preparing porous polybenzimidazole having well-connected picopores, comprising:
    providing polyaminoimide derived from poly(amino amic acid) solution formed by reacting an aromatic amine including at least two ortho-positioned amino groups and acid dianhydride;
    obtaining polypyrrolone from the polyaminoimide;
    subjecting the polypyrrolone to alkaline treatment; and
    subjecting the alkaline-treated polypyrrolone to heat treatment, wherein obtaining polypyrrolone is performed by heat treatment at 450 to 500° C. for 5 minutes to 2 hours under an inert atmosphere.

2. The method of claim 1, wherein the alkaline treatment of the polypyrrolone is performed at 60 to 120° C. for 10 minutes to 5 hours.

3. The method of claim 1, wherein the alkaline treatment of the polypyrrolone is performed using alkaline compounds selected from alkaline metal hydroxide, hydride, amide, alkoxide, and combinations thereof.

4. The method of claim 1, wherein the heat treatment of the alkaline treated polypyrrolone is performed at 150 to 500° C. for 5 minutes to 12 hours under an inert atmosphere.

5. The method of claim 4, wherein the heat treatment of the alkaline-treated polypyrrolone is performed at 400 to 500° C. for 5 minutes to 2 hours under an inert atmosphere.

6. The method of claim 1, wherein the polybenzimidazole comprises one of the compounds represented by the following Chemical Formulae 1 to 3:

[Chemical Formula 1]
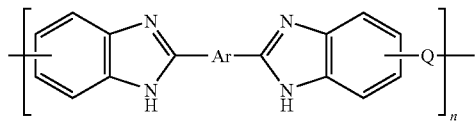

[Chemical Formula 2]
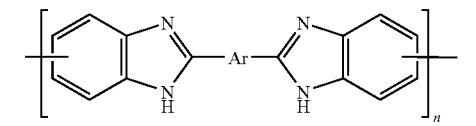

[Chemical Formula 3]
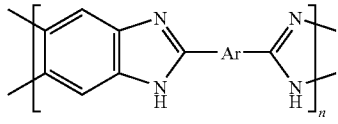

wherein, in the above Chemical Formulae 1 to 3,

Ar is an aromatic group selected from a substituted or unsubstituted divalent C6 to C24 arylene group and a substituted or unsubstituted divalent C4 to C24 heterocyclic group, where the aromatic group is present singularly; at least two aromatic groups are fused to form a condensed cycle; or at least two aromatic groups are linked by a single bond or a functional group selected from O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, or C(=O)NH, Q is O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with m-m, m-p, p-m, or p-p positions, and n is an integer ranging from 10 to 400.

7. The method of claim 1, wherein the polyaminoimide comprises one of the compounds represented by the following Chemical Formulae 4 to 6:

[Chemical Formula 4]
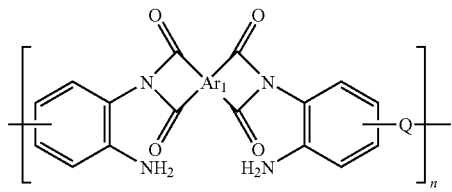

[Chemical Formula 5]
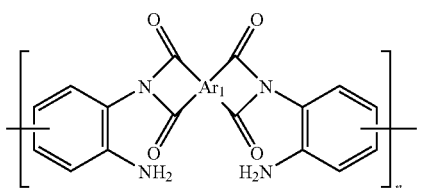

[Chemical Formula 6]
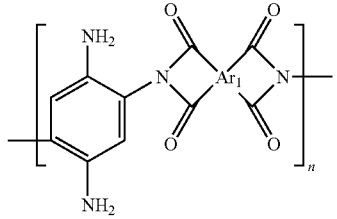

wherein, in the above Chemical Formulae 4 to 6,

Ar$_1$ is an aromatic group selected from a substituted or unsubstituted quadrivalent C6 to C24 arylene group and a substituted or unsubstituted quadrivalent C4 to C24 heterocyclic group, where the aromatic group is present singularly; at least two aromatic groups are fused to form a condensed cycle; or at least two aromatic groups are linked by a single bond or a functional group selected from O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, or C(=O)NH, Q is O, S, C(=O), CH(OH), S(=O)$_2$, Si(CH$_3$)$_2$, (CH$_2$)$_p$ (where 1≤p≤10), (CF$_2$)$_q$ (where 1≤q≤10), C(CH$_3$)$_2$, C(CF$_3$)$_2$, C(=O)NH, C(CH$_3$)(CF$_3$), or a substituted or unsubstituted phenylene group (where the substituted phenylene group is a phenylene group substituted with a C1 to C6 alkyl group or a C1 to C6 haloalkyl group), where the Q is linked with aromatic groups with aromatic groups with m-m, m-p, p-m, or p-p positions, p-m, or p-p positions, and n is an integer ranging from 10 to 400.

8. The method of claim 7, wherein Ar$_1$ is represented by one of the following chemical formulae:

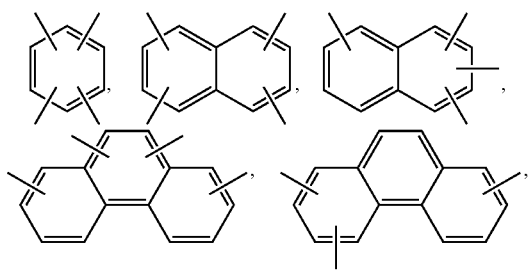

-continued

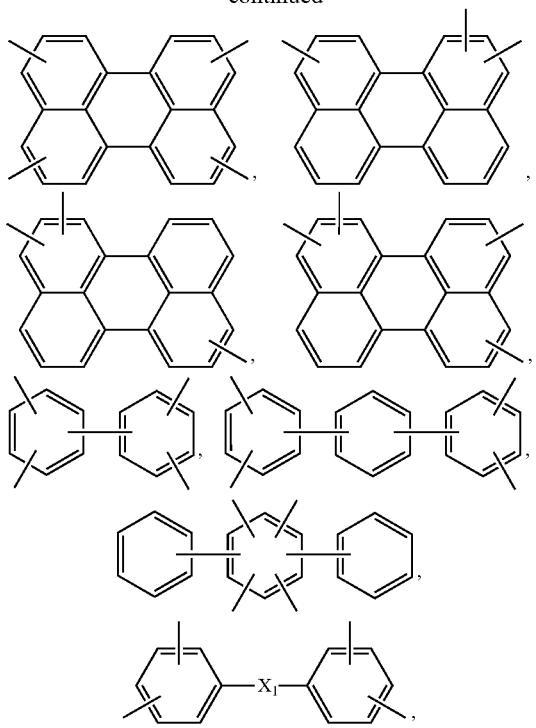

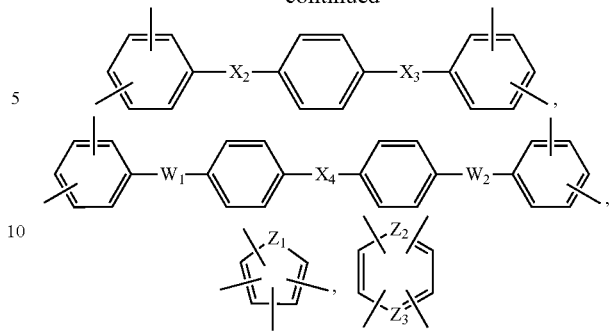

wherein, in the above chemical formulae, $X_1$, $X_2$, $X_3$, and $X_4$ are independently O, S, C(=O), CH(OH), S(=O)$_2$, Si(CH$_3$)$_2$, (CH$_2$)$_p$ (where 1≤p≤10), (CF$_2$)$_c$, (where 1≤q≤10), C(CH$_3$)$_2$, C(CF$_3$)$_2$, or C(=O)NH, $W_1$ and $W_2$ are independently O, S, or C(=O), $Z_1$ is O, S, CR$_1$R$_2$ or NR$_3$, where R$_1$, R$_2$, and R$_3$ are the same or different from each other and are independently hydrogen or a C1 to C5 alkyl group, and $Z_2$ and $Z_3$ are the same or different from each other and are independently N or CR$_4$ (where R$_4$ is hydrogen or a C1 to C5 alkyl group) provided that both $Z_2$ and $Z_3$ are not CR$_4$.

* * * * *